United States Patent [19]

Thomsen

[11] Patent Number: 4,888,743
[45] Date of Patent: Dec. 19, 1989

[54] METHOD OF SEISMIC SURVEYING FOR RESOLVING THE EFFECTS OF FORMATION ANISOTROPY IN SHEAR WAVE REFLECTION SEISMIC DATA

[75] Inventor: Leon A. Thomsen, Tulsa, Okla.
[73] Assignee: Amoco Corporation, Chicago, Ill.
[21] Appl. No.: 925,756
[22] Filed: Oct. 30, 1986
[51] Int. Cl.$^4$ .............................................. G01V 10/36
[52] U.S. Cl. ..................................................... 367/75
[58] Field of Search ......................... 367/75, 73, 36, 37

[56] References Cited

FOREIGN PATENT DOCUMENTS 0169075 1/1986 European Pat. Off. .
0169076 1/1986 European Pat. Off. .

OTHER PUBLICATIONS

"The Variation of Delays in Stress—Induced Anisotropic Polarization Anomalies", Stuart Crampin and Robert McGonigle, Geophys. J. R. Astr. Soc., (1981), 64, 115–131.
Keith et al., "Seismic Body Waves in Anisotropic Media: Reflection and Refraction at a Plane Interface", Geophys. J. R. Astr. Soc., (1977), 47, 181–208.
Keith et al., "Seismic Body Wave in Anisotropic Media: Synthetic Seismograms", Geophys. J. R. Astr. Soc., (1977), 49, 225–243.
Booth et al., "The Anisotropic Reflectivity Technique: Anomalous Reflected Arrivals from an Anisotropic Upper Mantle", Geophys. J. R. Astr. Soc., (1983), 72, 767–782.
Booth et al., "The Anisotropic Reflectivity Technique: Theory", Geophys. J. R. Astr. Soc., (1983), 72, 755–766.
Crampin, "Seismic Anisotropy—A Summary", Geophys. J., 1977, 43, 499–501.
Crampin et al., "Estimating Crack Parameters from Observations of P—Wave Velocity Anistropy", Geophysics, 45, 3, 1980, 345–360.
Crampin, "Seismic Wave Propagation Through a Cracked Solid: Polarization as a Possible Dilatancy Diagnostic", Geophys. J. R. Astr. Soc., (1978), 53, 467–496.
Crampin, "A Review of the Effects of Aniostropic Layering on the Propagation of Seismic Waves", Geophys. J. R. Astr. Soc., (1977), 49, 9–27.
Crampin, "Evaluation of Anisotropy by Shear—Wave Splitting", Geophysics, vol. 50, No. 1985, pp. 142–152.
Crampin, "Evidence for Alligned Cracks in the Earth's Crust", First Break, vol. 3, No. 3, 1985, pp. 12–15.
Devaney et al., "A Plane—Wave Decomposition for Elastic Wave Fields Applied to the Separation of P—Waves and S Waves in Vector Seismic Data", Geophysics, vol. 51, No. 2, 1986, pp. 419–423.
Crampin, "Anistropy in Exploration Seismics", First Break, Mar. 1984, pp. 19–21.
Lynn, "Seismic Detection of Oriented Fractures", Oil and gas Journal, Aug. 4, 1986, pp. 54–55.

*Primary Examiner*—Thomas H. Tarcza
*Assistant Examiner*—Mark Hellner
*Attorney, Agent, or Firm*—Timothy D. Stanely

[57] ABSTRACT

A novel method of seismic exploration has been developed to resolve confusing and distorted shear wave reflection seismic data which can be obtained in areas having anisotropic formations. In particular, the present method of shear wave seismic exploration comprises imparting first shear wave seismic energy into the earth at selected points with a first source having a first polarization with respect to the line of survey, and recording first signals representative of the earth's response with first geophones having a first polarization with respect to the line of survey. Also, second shear wave energy is imparted into the earth at selected points along the line of survey, with a second shear wave source having a second polarization with respect to the line of survey, and recording second signals representative of the earth's response with second geophones having a second polarization with respect to the line of survey. With a measure of the angle between the survey line and a principal axis of an underlying azimuthally anisotropic formation, the first and second signals are inverted to obtain principal component signals in which the confusing and distorted shear wave reflection seismic data resulting from anisotropic formations can be ameliorated.

20 Claims, 14 Drawing Sheets

METHOD OF SEISMIC SURVEYING FOR RESOLVING THE EFFECTS OF FORMATION ANISOTROPY IN SHEAR WAVE REFLECTION SEISMIC DATA

BACKGROUND OF THE INVENTION

The present invention relates generally to seismic surveying and specifically to a method for resolving the effects of formation anisotropy in shear wave reflection seismic data.

Exploration geophysicists have generally considered the earth's subsurface formations to be locally homogeneous and isotropic. See for example Devaney and Oristaglio, *Geophysics*, v. 51, No. 2, p. 419–423 (February, 1986). However, seismologists investigating earth parameters in the study of earthquakes have begun to consider the effects of anisotropic earth media on the propagation of seismic waves in the following articles:

S. Crampin and R. McGonigle, "The Variation of Delays in Stress-Induced Anisotropic Polarization Anomalies," *Geophys. J. R. astr. Soc.* (1981), v. 64, pp. 115–131.

C. Keith and S. Crampin, "Seismic Body Waves in Anisotropic Media: Reflection and Refraction at a Plane Interface," *Geophys. J. R. astr. Soc.* (1977), v. 49, pp. 181–208.

C. Keith and S. Crampin, "Seismic Body Waves in Anisotropic Media: Synthetic Seismograms," *Geophys. J. R. astr. Soc.* (1977), v. 49, pp. 225–243.

D. Booth and S. Crampin, "The Anisotropic Reflectivity Technique: Anomalous Reflected Arrivals from an Anisotropic Upper Mantle," *Geophys. J. R. astr. Soc.* (1983), v. 72, pp. 767–782.

D. Booth and S. Crampin, "The Anisotropic Reflectivity Technique: Theory," *Geophys. J. R. astr. Soc.* (1983), v. 72, pp. 755–766.

S. Crampin, "Seismic Anisotropy—A Summary," *J. Geophys.*, v. 43 (1977), pp. 499–501.

S. Crampin, R. McGonigle and D. Bamford, "Estimating Crack Parameters from Observations of P-wave Velocity Anisotropy," *Geophysics*, v. 45, No. 3 (1980), pp. 345–360.

S. Crampin, "Seismic-Wave Propagation Through a Cracked Solid: Polarization as a Possible Dilatancy Diagnostic," *Geophys. J. R. astr. Soc.* v. 53, No. 3 (1978), pp. 467–496.

S. Crampin, "A Review of the Effects of Anisotropic Layering on the Propagation of Seismic Waves," *Geophys. J. R. astr. Soc.* v. 49 (1977), pp. 9–27.

All of the above have focused on theoretical or observational investigations regarding the propagation of seismic waves in the earth or mathematical models or laboratory media having an anisotropic character with applications to the deep interior of the earth.

Recent acquisitions of exploration shear wave reflection seismic data have often yielded confusing and distorted seismic data which cannot be interpreted. Applicant has found that a significant cause of such confused and distorted shear wave reflection seismic data can be traced to the generally accepted assumptions regarding locally homogeneous and isotropic earth formations. Consequently, Applicant has developes a novel method of shear wave seismic exploration to ameliorate the deleterious effects of formation anisotropy. Moreover, Applicant's novel method of shear wave seismic exploration can be employed to detect and resolve azimuthal variations in the earth's subsurface formations resulting from preferentially oriented fractures and intrinsic anisotropy.

SUMMARY OF THE INVENTION

According to the present invention, a novel method of seismic exploration has been developed for resolving the effects of formation anisotropy in shear wave reflection seismic data. The method resolves confusing and distorted shear wave reflection seismic data obtained in areas having anisotropic formations. In particular, the present method of shear wave seismic exploration includes the steps of imparting first shear wave seismic energy into the earth at selected points along a line of survey, with a first shear wave source having a first polarization with respect to the line of survey. First signals representing the earth's response are recorded with first geophones having a first polarization with respect to the line of survey. Also, second shear wave energy is imparted into the earth at selected points along the line of survey, with a second shear wave source having a second polarization with respect to the line of survey. Second signals representing the earth's response are recorded with second geophones having a second polarization with respect to the line of survey. With a measure of the angle between the line of survey and a principal axis of a subterranean azimuthally anisotropic formation, the first and second signals are inverted to ameliorate the effect of shear wave birefringence in the first and second signals.

DETAILED DESCRIPTION OF THE PREFERRED EMBODIMENT

I. Introduction

At the outset, brief introductory remarks are provided as an overview to assist in understanding the subject matter of the present invention. When formations are fractured or cracked at depth, the fractures are usually oriented nearly vertically. Moreover, oriented fractures in formation usually make the formation anisotropic, i.e., the rock properties vary with direction. The term "direction" as used herein can mean either direction of propagation or direction of polarization. If there is a regional tectonic stress or paleo-stress, the fractures can be oriented nearly parallel with their planar surfaces substantially perpendicular to the horizontal direction of least compressive stress. Such formations can be characterized by a vector perpendicular to planar surfaces which is called the unique axis. Formations are considered to be azimuthally anisotropic if formation properties vary with azimuthal direction. Although such parallel fracture systems are used as an exemplar of azimuthal anisotropy, it is understood that the following discussion is germane to other causes of azimuthal anisotropy.

In the present invention the pronounced differences in formation characteristics with respect to various azimuthal directions (e.g., in the shear modulus, shear velocity, etc.) of azimuthally anisotropic formations can be advantageously employed. For example, if shear waves are imparted into an azimuthally anisotropic formation so that the polarization, i.e., the direction of particle motion, of the imparted shear wave is substantially parallel to the fracture strike, the shear wave propagates at substantially the shear velocity of the formation. However, if the shear waves are imparted into the azimuthally anisotropic formation so that the polarization of the imparted shear wave is substantially perpendicular to the fracture strike, the shear wave propagates at a shear wave velocity which depends upon a combination of formation and fracture properties, and which can be noticeably less than the shear wave velocity of the formation itself.

Additionally, it has been found that when shear waves are imparted into azimuthally anisotropic formation so that the polarization of the imparted shear wave is oblique to the fracture strike of the formation, the shear wave is "split" into two separate components having different polarizations, i.e., one parallel with the unique axis and the other perpendicular thereto. Such shear wave "splitting" is sometimes called shear wave birefringence.

Those skilled in the art understand that a shear wave polarized transversely with respect to a seismic line of profile is commonly called SH. Conversely, a shear wave polarized in-line with respect to the seismic line of profile is commonly called SV.

Figure 1:
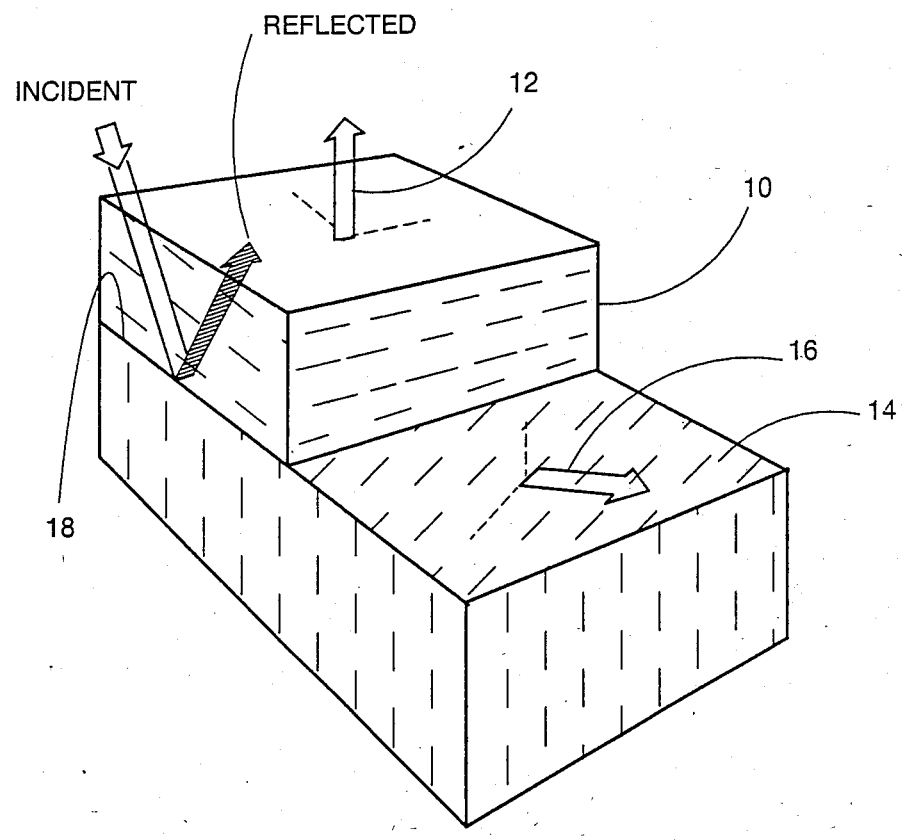
FIGS. 1, 2, 3, and 4 are simplified diagrams of fractured subsurface earth formations.

Only transversely isotropic formations are considered explicity in this explanatory discussion, although more generally anisotropic media will show similar effects. Transversely isotropic media have one unique axis and two equivalent axes (both at right angles to the unique axis) such as shown in each formation layer of FIG. 1; the unique axis may or may not be vertical. Formation anisotropy as shown in layer 10 is most commonly due to:

(1) homogenous but anisotropic beds (typically shales) which have a preferred orientation of mineral grains, due to settling under gravity;

(2) isotropic beds, thinly layered, so that a sound wave with a wave length much longer than the layer thicknesses averages over many layers and propagates as if in a homogeneous, anisotropic media;

(3) horizontal fractures, if the layer is not deeply buried; and/or (4) vertical fractures whose planar surfaces are oriented randomly in all horizontal directions.

These effects may be present in any combination.

It is common in geophysics that the later 10 has its unique axis 12 vertical, because the direction of gravity is the ultimate cause of anisotropy. However, in the case where transverse isotropy occurs in regions having some tectonic stress, a preferred horizontal direction is imparted to the fractures. In such a setting, tensile fractures may open with their planar surfaces perpendicular to the direction of least compressive stress. If the formation is otherwise isotropic, such fractures create a transversely isotropic medium 14 whose unique axis 16 is horizontal. Formations exhibiting such characteristics are considered to be azimuthally anisotropic. The effects of anisotropy on shear wave propagation can be used according to the present invention to detect the presence of azimuthally anisotropic formations and resolve their deleterious effect in seismic data quality.

To aid in this discussion the symbols in Table I below have been employed:

TABLE I $\bar{x}_i$ are the principal axes, $\bar{x}_1$, $\bar{x}_2$ of an anisotropic formation;

$\bar{X}_J$ are the principal axes, $\bar{X}_H$, $\bar{X}_V$ of the source/geophone polarizations referenced to the survey line;

SV is the amplitude of the shear wave polarized predominantly along the $\bar{X}_V$ axis, i.e., inline with respect to the survey line;

SH is the amplitude of the shear wave polarized predominantly along the $\bar{X}_H$ axis, i.e., transverse with respect to the survey line;

$SV_i$ is a component of the imparted SV shear wave along the $\bar{x}_i$ axis of the anisotropic formation;

$SH_i$ is a component of the imparted SH shear wave along the $\bar{x}_i$ axis of the anisotropic formation;

$SV_{i,J}$ is a component of the $SV_i$ shear wave imparted along the $\bar{x}_i$ axis of the anisotropic formation and detected by a geophone having a polarization predominantly along the $\bar{X}_J$ axis of the anisotropic formation;

$SH_{i,J}$ is a component of the $SH_i$ shear wave imparted along the $\bar{x}_i$ axis of the anisotropic formation and detected by a geophone having a polarization predominantly along the $\bar{X}_J$, axis;

$R_i(t)$ or $R_J(t)$ are the signals recorded by geophones having polarizations predominantly along the $\bar{x}_i$ or $\bar{X}_J$ axis;

$r_i(t)$ is the "principal reflectivity series" for shear waves polarized along the $\bar{x}_i$ axis of the anisotropic formation;

$\bar{r}_i(t)$ is the "principal time series" associated with $r_i(t)$;

w(t) is the seismic wavelet of the imparted shear wave, either SH or SV;

* is a symbol representing the mathematical operation of convolution; and $f_i$ represents a filter which takes into account the attenuation and dispersion of seismic wave energy by the earth's formations along the $\bar{x}_i$ axis of the formation.

II. Effects on Velocity

Whenever a seismic survey is conducted over a formation which is anisotropic, the moveout velocity obtained by standard methods is not equal to the vertical velocity of the medium. This is true even in the absence of layering and dip of reflectors. The moveout velocity differs from vertical velocity simply because of the angular dependence of the wave velocity. The true velocity can be used along with vertical travel time to determine a depth to or thickness of a given bed, i.e., to convert a time section to a depth section. Hence, if the moveout velocity is naively taken to be equal to the vertical velocity, a misestimation of depth and/or thickness may result. The discussion below pertains to the true vertical velocity and not the apparent or moveout velocity.

Figure 2:
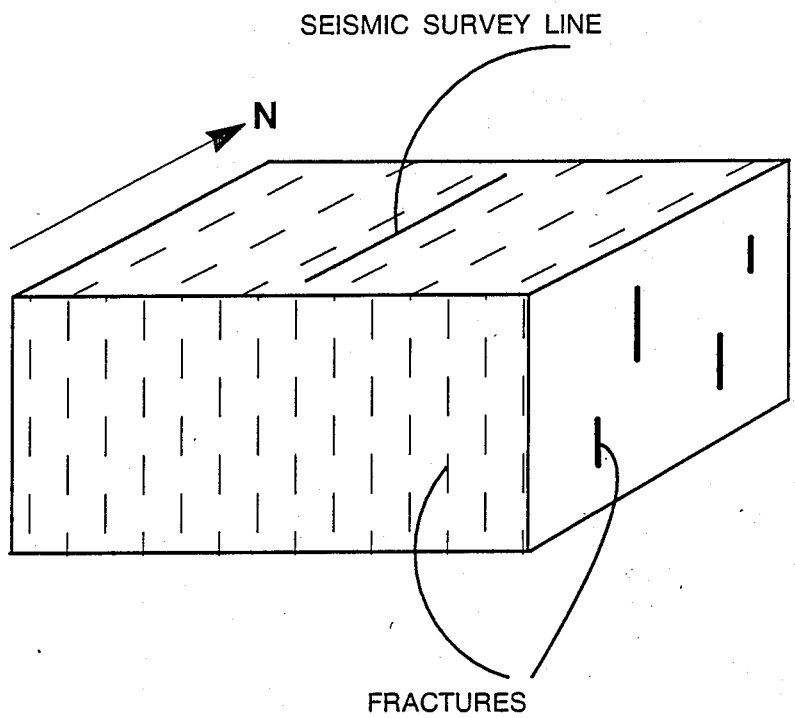

A. Azimuthally Anisotropic Formations; Survey Line Perpendicular to the Unique Axis The geometry for this case is shown in FIG. 2 and can be best understood with the help of an analogy. Imagine that the azimuthally anisotropic formation can be represented by a thick deck of cards, standing on their edges. The empty planes between the cards represent fractures and the deck is oriented so the edges of the cards show on two ends and the top of the deck. Pressing one's hand down on the top of the deck represents a vertically incident compressional (P) wave front. As the hand oscillates up and down simulating longitudinal particle displacement, the deck deforms only with difficulty. The fractures have not substantially weakened the deck. To deform the deck requires that the cards themselves, analogous to the uncracked formations, must be deformed. The high resistance to longitudinal deformation implies a large longitudinal elastic modulus and hence a large longitudinal velocity.

Now, with SH shear wave energy imparted vertically into the earth along the survey line shown in FIG. 2, such shear wave energy will have a generally east-west displacement. The hand in the analogy now represents a vertically incident SH wave front. As the hand oscillates east-west across the top of the deck, simulating SH displacement, the deck deforms easily in shear. The zones of weakness between cards allow the cards to slide past one another so that the strain occurs in the weak fractures rather than the strong rock. The low resistance to shear implies a low shear modulus $\mu_o$ and hence a low shear velocity, $\beta_o$.

By contrast, with SV shear wave energy imparted vertically into the earth along the survey line shown in FIG. 2, the hand oscilates north-south along the top of the deck. Here, the fractures cannot accommodate the strain and to deform the deck one must actually deform the cards themselves. This is clearly harder to do since the hand is straining against the modulus $\mu_s$ of the deck and $\mu_s$ is greater than $\mu_o$. Hence, its shear velocity $\beta_s$ will be greater than $\beta_o$.

The contrast between the shear velocities $\beta_s$ and $\beta_o$ in the card analogy is greater than the contrast found for the azimuthally anisotropic formation because the fractures in the anisotropic formation are not continuous throughout the region as in the deck. However, the principle is the same.

Figure 3:
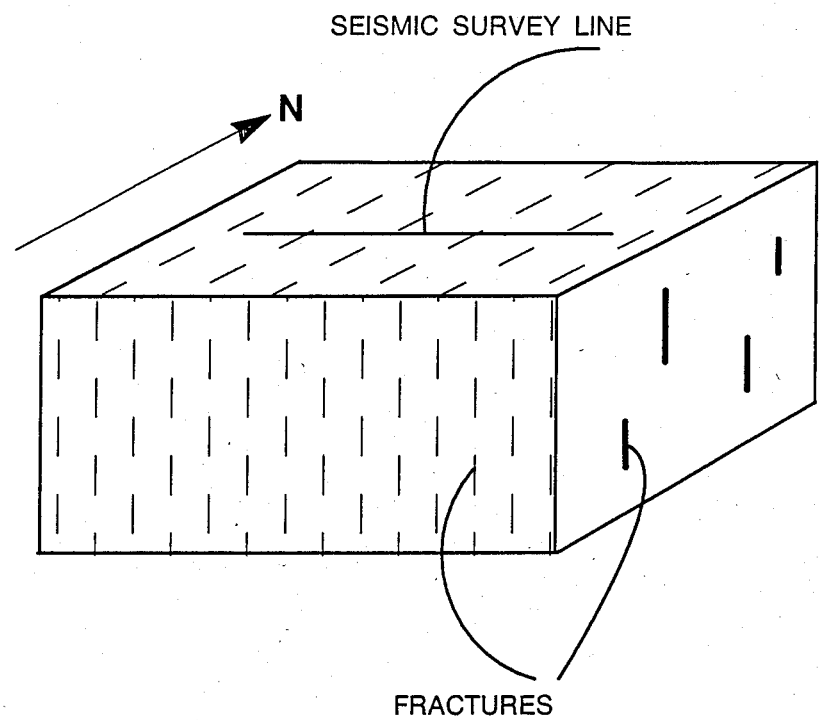

B. Azimuthally Anisotropic Formation; Survey Line Parallel to the Unique Axis The geometry for this case is shown in FIG. 3. Looking to FIG. 3 and referring again to the deck of cards analogy, the hand representing a vertically incident compressional P wave front as before must deform the cards themselves in order to deform the deck. Hence, the fractures do not weaken a deck regardless of their azimuthal orientation with respect to the seismic line survey.

SH shear wave energy imparted vertically into the earth along the survey line in FIG. 3 will have a generally north-south displacement. The hand in the analogy now represents a vertically incident SH wave front. Consequently, the deck deforms north-south. As discussed before, the fractures do not weaken rock for this direction of displacement. Hence, the effective shear modulus $\mu_s$ and the shear velocity $\beta_s$ are high. Conversely, with the hand representing a vertically incident SV wave front on the seismic line of survey in FIG. 3, an east-west oscillation will be imparted to the deck of cards. And as discussed before, the fractures do weaken the rock and hence the effective shear modulus $\mu_o$ and shear velocity $\beta_o$ will be reduced.

In light of the above analysis, the following generalizations can now be made about vertical velocities obtained from two seismic survey lines crossing at right angles over a region containing an azimuthally anisotropic formation in which the unique axis of the azimuthally anisotropic formation is parallel to one of the two seismic lines of survey. These comments do not apply to the relevant apparent or moveout velocities obtained by comparing moveouts along the reflection hyperbole on the two stacked sections.

(1) The compressional P velocity will be nearly the same on both lines, especially for near offsets. That is, the compressional survey lines should tie together well and there will be little indication of the presence of an azimuthally anisotropic formation.

(2) The SH velocity will be less on the survey line perpendicular to the unique axis of the azimuthally anisotropic formation.

(3) The SV velocity will be less on the survey line parallel to the unique axis of the azimuthally anisotropic formation.

In the case where both SH and SV velocities are measured along a single survey line, the rules above are not applicable; however, the same principles yield the following generalization.

(4) If the survey line is roughly parallel to the unique axis of the azimuthally anisotropic formations, the SH velocity will be greater than the SV velocity, whereas if the survey line is roughly perpendicular to the unique axis of the azimuthally anisotropic formations, the SH velocity will be less than the SV velocity.

These features can serve as an aid to those skilled in the art to identify the azimuthal anisotropy, and hence the presence, orientation as well as the contents of fractures in terms of vertical velocities.

C. Azimuthally Anisotropic Formation: Survey Line Oblique to Unique Axis

Figure 4:
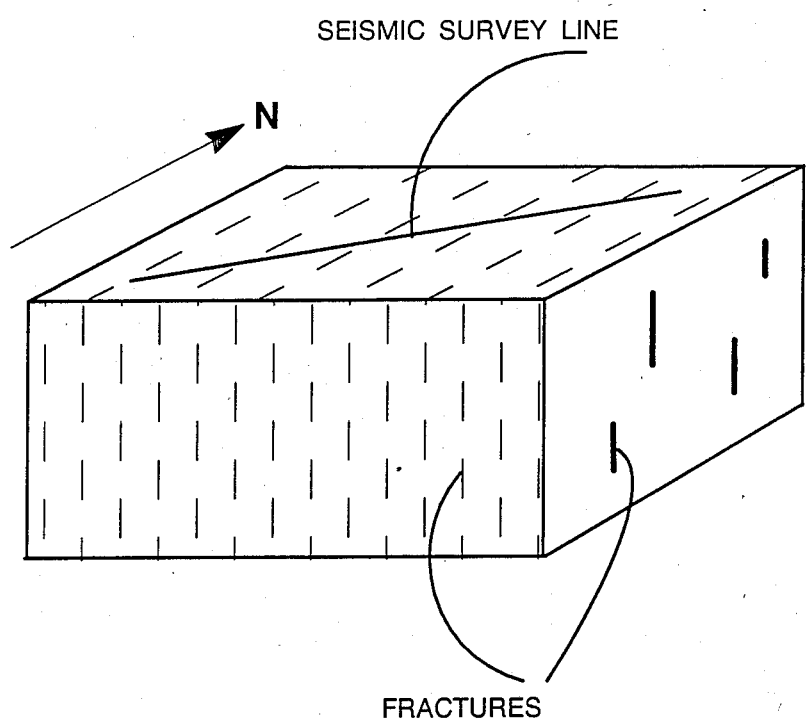

The geometry for this case is shown in FIG. 4. Referring again to the deck of cards analogy, the hand representing a vertically incident P wavefront must deform the cards themselves in order to deform the deck. The fractures do not weaken the deck, regardless of their azimuthal orientation with respect to the seismic line of survey.

Now, with the hand representing either a vertically incident shear SV wavefront or SH wavefront imparted at selected points along the seismic line of survey in FIG. 4, either a northeast-by-southwest or northwest-by-southeast oscillation will be imparted into the earth. Since the particle displacements of the SV and SH wavefronts do not coincide with the principal axes of the anisotropic formation, i.e., $\bar{x}_1$, $\bar{x}_2$, both shear waves are subjected to shear wave birefringence or "splitting". That is, the shear wave displacements, either SH or SV, are resolved into twio components, one along the formation unique axis, i.e., $\bar{x}_1$, and the other along the axis perpendicular thereto, i.e., $\bar{x}_2$. As a consequence, the imparted shear wave energy encounters two different shear moduli, i.e., one ($\mu_s$) parallel to the unique axis $\bar{x}_1$, and the other ($\mu_o$) parallel to axis $\bar{x}_2$. The "split" shear wave energy will travel at two different velocities ($\beta_s$, $\beta_o$) through the anisotropic formation.

III. Effect On Recorded Signals: SH Survey

Azimuthally anisotropic formations can be considered to have different reflectivity series as a function of azimuth. For example $r_1(t)$ describes the reflectivity series for shear waves polarized parallel to the unique axis of the azimuthally anisotropic formation, i.e., along the $\bar{x}_1$ axis and $r_2(t)$ describes the reflectivity series for the azimuthally anisotropic formation for shear waves polarized perpendicular to the unique axis, i.e., along the $\bar{x}_2$ axis. Because of the differences in shear wave velocities according to each of the two principal directions ($\bar{x}_1$, $\bar{x}_2$), the downgoing shear wavefronts encounter the same layer interface at different times, resulting in differing reflectivity series. The reflectivity series $r_1(t)$ can appear as a scaled in amplitude and stretched in time version of $r_2(t)$, in the simple case where the orientation of anisotropy (e.g., of fractures) is uniform with depth. The seismic signals recorded by a vgeophone can be described as the convolution of the imparted seismic wavelet with the appropriate reflectivity series and with a filter which takes into account dispersion, attention, etc. of the earth's formations.

Figure 5:
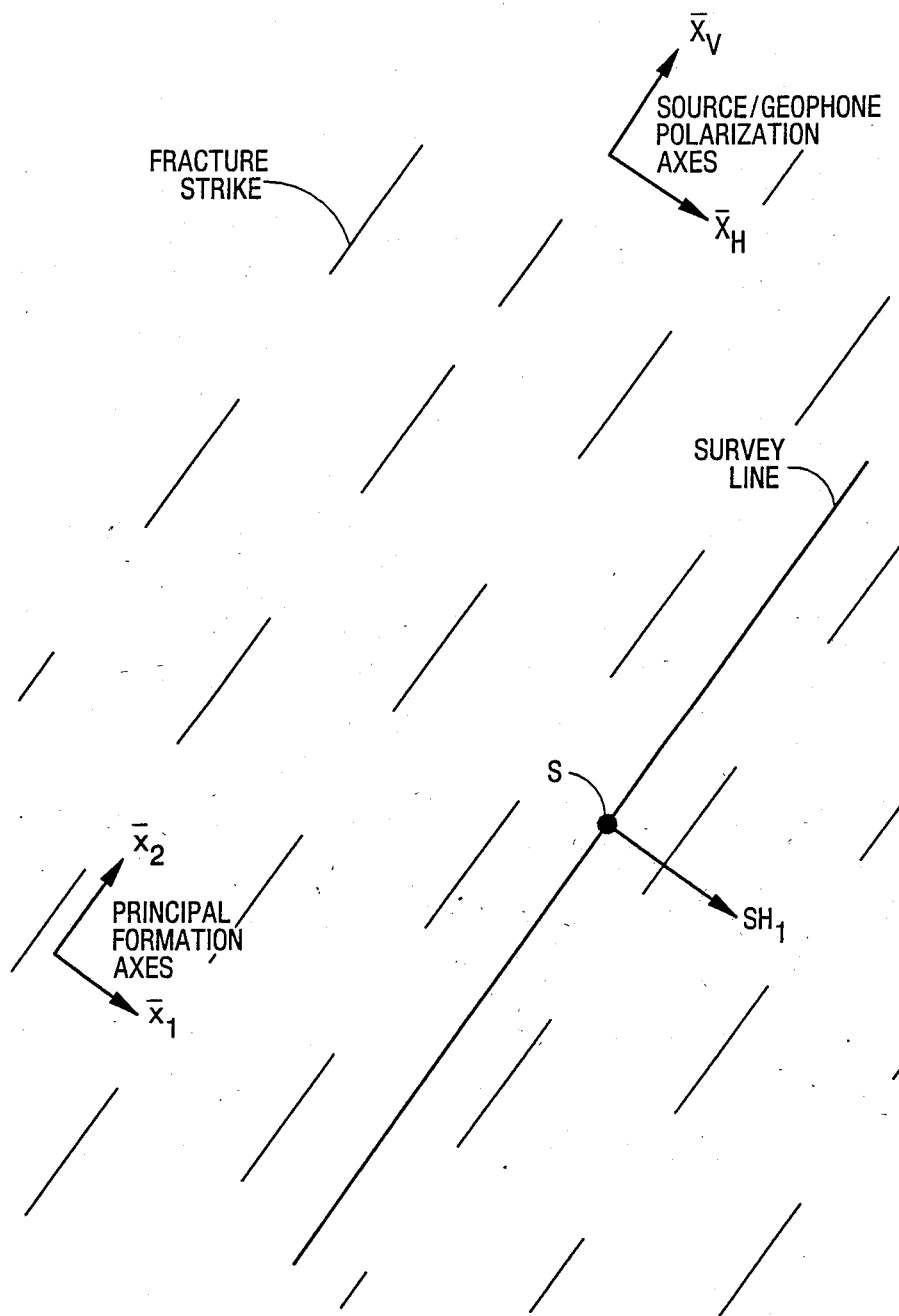
FIGS. 5, 6, 7, and 8 are simplified representations of the azimuthal relationships of source/geophone polarizations, survey line orientations, and anisotropic formation principal axes.

The effects of azimuthally anisotropic formations on the propagation of seismic wave energy can be seen most vividly in the signals recorded using source/geophone pairs having various polarizations with respect to the principal axes ($\bar{x}_1$, $\bar{x}_2$) of the anisotropic formations. In a first example depicted in map view in FIG. 5, a survey line is shown parallel to the formation axis $\bar{x}_2$ and a source S is adapted to impart shear wave seismic energy having a polarization vector $\overline{SH}_1$ parallel to the $\bar{x}_1$ axis of the formation. A geophone R (not shown) having matched polarization to that of the imparted shear wave, i.e., parallel to the $\bar{x}_1$ axis, will record a signal:

$$R_1(t) = SH_1 \cdot f_1 * w_1(t) * r_1(t) \quad (1)$$

where $SH_1$ is the magnitude of the imparted shear wave seismic energy.

If the geophone R had a polarization which is orthogonal to the polarization of the imparted shear wave $SH_1$, i.e., parallel to the $\bar{x}_2$ axis of the formation, no signal would be recorded, i.e., $R_2(t) = 0$.

Figure 6:
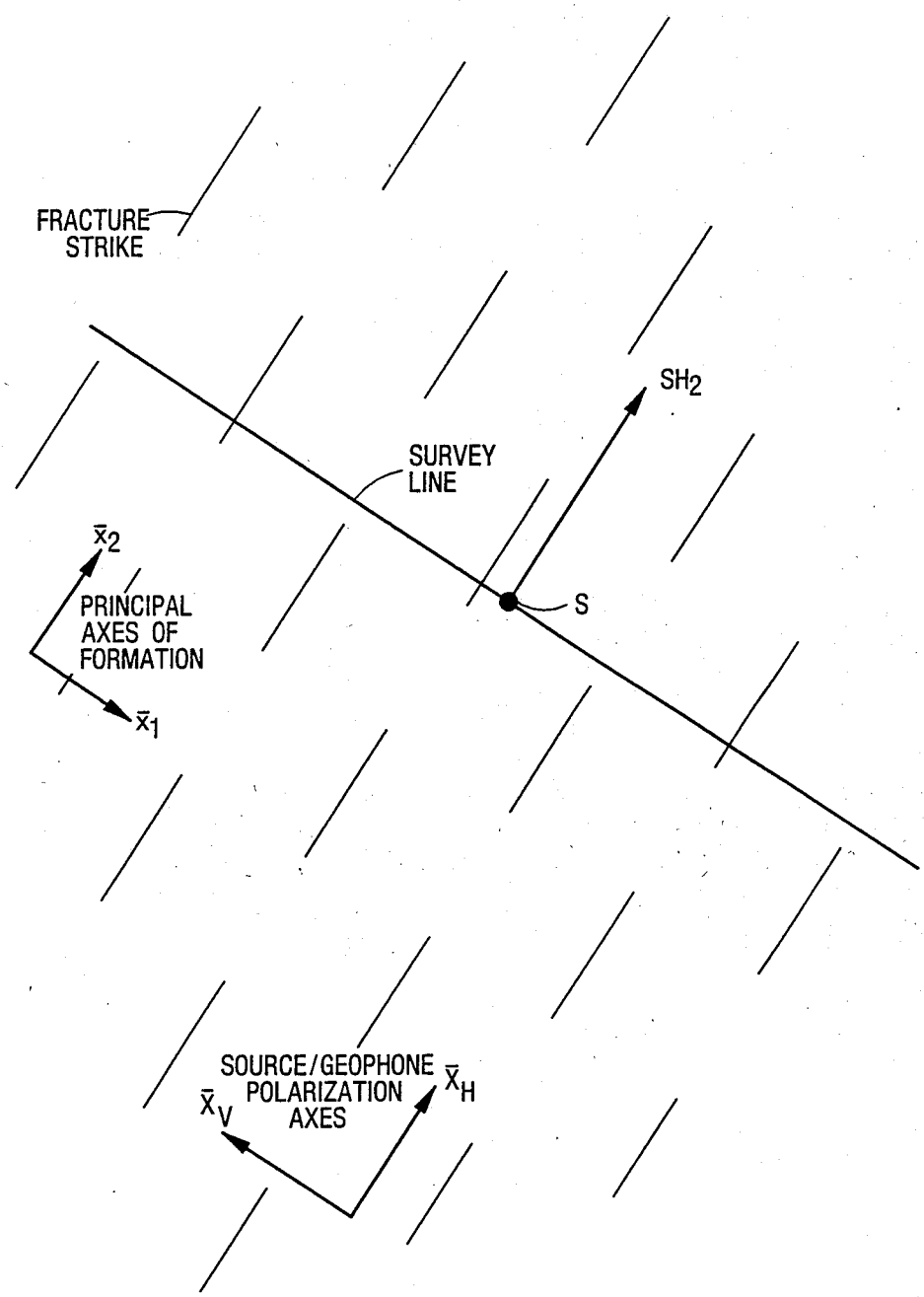

As a second example, in FIG. 6, a survey line is perpendicular to the fracture strike axis and the source S is adapted to impart shear wave energy having a polarization vector $\overline{SH}_2$ parallel to the $\bar{x}_2$ axis. A geophone R (not shown) having a polarization matching that of the imparted shear wave, i.e., parallel to the $\bar{x}_2$ axis will record a signal as follows:

$$R_2(t) = SH_2 \cdot f_2 * w_2(t) * r_2(t) \quad (2)$$

where $SH_2$ is the magnitude of the imparted shear wave seismic energy.

If the geophone R were to have a polarization which is orthogonal to that of the imparted shear waves $SH_2$, i.e., parallel to axis $\bar{x}_1$, no signal would be recorded, i.e., $R_1(t) = 0$.

If the formation anisotropy is small, the filters $f_1$ and $f_2$ will be similar. For simplicity, one can regard them in this example and other examples below to be equal. Similarly, the wavelets $w_1(t)$ and $w_2(t)$ may differ under the partial control of the survey operator. Again, for simplicity in the example, one can treat them as equal.

Additionally, one can chose to rewrite the expression $f_1 * w_1(t) * \bar{r}_1(t)$ as $r_1(t)$ and the expression $f_2 * w_2(t) * r_2(t)$ as $\bar{r}_2(t)$. The time series $\bar{r}_1(t)$ and $\bar{r}_2(t)$ are called the principal time series.

Figure 7:
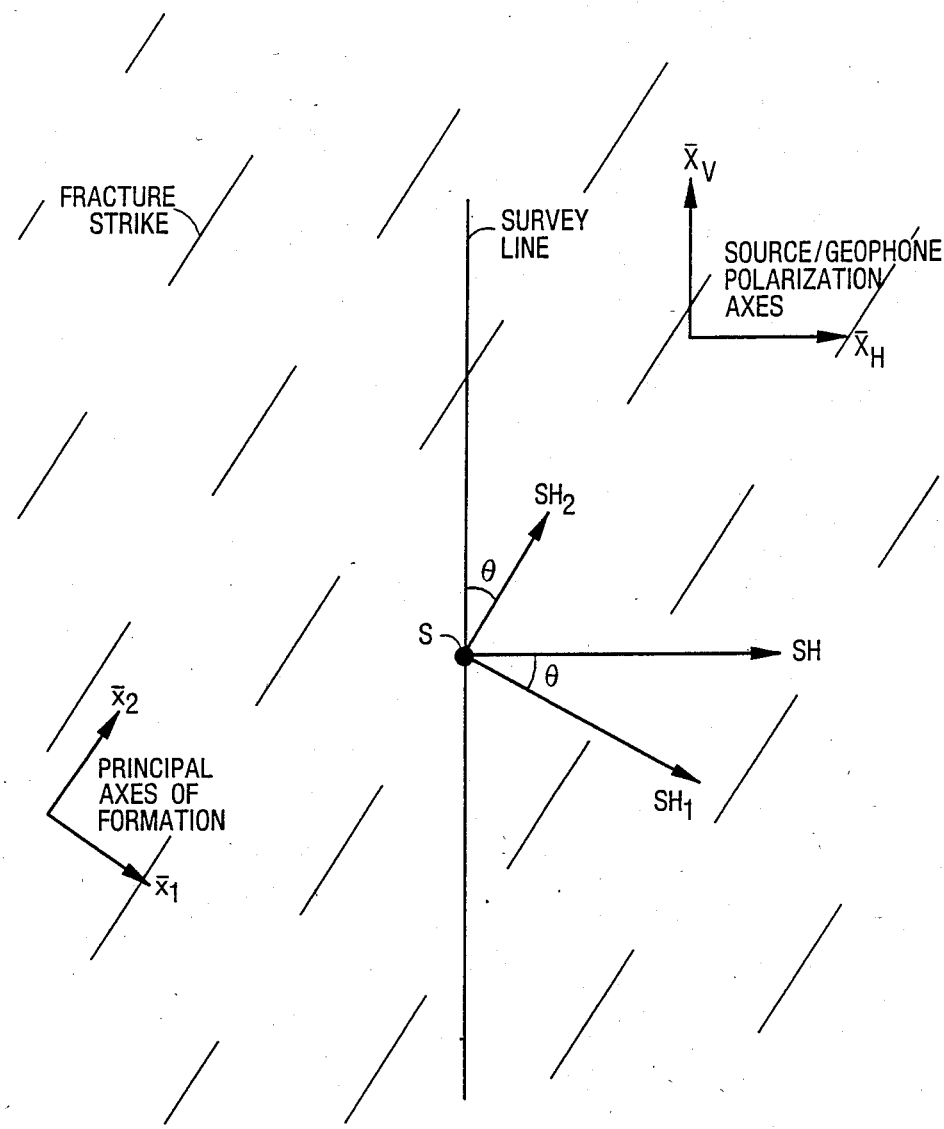

As a third example, in FIG. 7, a survey line is at an oblique angle to the fracture strike or unique axis of an anisotropic formation. In particular, FIG. 7 depicts shear wave energy being imparted into the earth by a source S having a polarization vector $\overline{SH}$ directed parallel to the $\overline{X}_H$ axis of the source/geophone coordinate system, referenced to the survey line. The natural polarization of the anisotropic formation is indicated by formation principal axes $\bar{x}_1$ and $\bar{x}_2$ as before. In this case the polarization of the imparted shear wave SH makes an angle ($\theta$) with respect to the unique axis $\bar{x}_1$ of the anisotropic formation. Assuming the imparted shear wave to be a vector of magnitude SH in the direction of the $\overline{X}_H$ axis, it can be expressed in formation coordinates ($\bar{x}_1$, $\bar{x}_2$) as follows:

$$\overline{SH} = SH_1 \bar{x}_1 + SH_2 \bar{x}_2$$

where $SH_1 = SH \cos \theta$ and $SH_2 = SH \sin \theta$, where SH is the magnitude of the imparted shear wave seismic amplitude.

As the SH shear wave enters the anisotropic formation, it "splits" into two mutually orthogonal components $SH_1$ and $SH_2$ which conform to the two possible transverse modes of propagation of the anisotropic formation. The $SH_1$ component will propagate at a velocity slower than the $SH_2$ component as previously discussed. The rate of separation in time of the split components is dependent upon the differences in velocities along the principal axis of the anisotropic formation.

If a geophone R (not shown) along the line of survey has a polarization aligned parallel to the $\bar{x}_1$ axis, it will only detect the slower shear wave motion $SH_1$ as follows:

$$R_1(t) = SH_1 \cdot \bar{r}_1(t) = SH \cos \theta \cdot \bar{r}_1(t). \quad (3a)$$

If the geophone R polarization is aligned parallel to the $\bar{x}_2$ direction, only the faster shear wave $SH_2$ will be detected as follows:

$$R_2(t) = SH_2 \cdot \bar{r}_2(t) = SH \sin \theta \cdot \bar{r}_2(t). \quad (3b)$$

Figure 8:
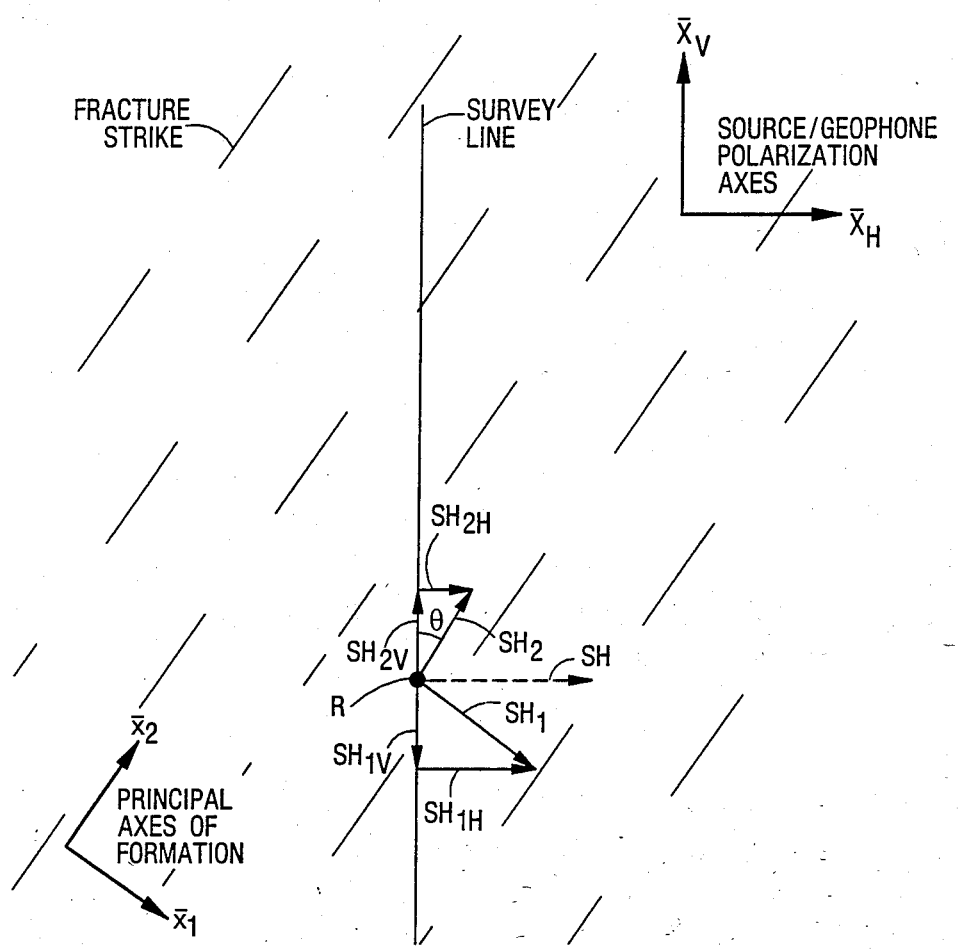

In FIG. 8, the geophone R polarization matches the polarization of the shear wave source, i.e., parallel to the $\overline{X}_H$ axis as shown by the dashed line SH. The geophone R will now respond to components of both the slower $SH_1$ and faster $SH_2$ shear waves according to the projection of their polarizations onto the geophone polarization axis $\overline{X}_H$, i.e., $SH_{1H}$ and $SH_{2H}$, where $SH_{1H} = SH_1 \cos \theta$, $SH_{2H} = SH_2 \sin \theta$, $SH_1 = SH \cos \theta$, $SH_2 = SH \sin \theta$. The recorded signal will be:

$$\begin{aligned} R_H(t) &= SH_{1H} \cdot \bar{r}_1(t) + SH_{2H} \cdot \bar{r}_2(t) \\ &= SH_1 \cdot \bar{r}_1(t) \cos\theta + SH_2 \cdot \bar{r}_2(t) \sin\theta \\ &= SH \cdot \bar{r}_1(t) \cos^2\theta + SH \cdot \bar{r}_2(t) \sin^2\theta \end{aligned} \quad (4)$$

or more simply a combination of $R_1(t)$ and $R_2(t)$ previously discussed in Eqs. (3a, b) as:

$$R_H(t) = R_1(t) \cos \theta + R_2(t) \sin \theta \quad (5)$$

Consequently, the source, producing SH shear wave energy polarized predominantly in the $\overline{X}_H$ direction, will give rise to both $SH_1$ and $SH_2$ shear wave components. Projections of both components will be recorded on a geophone R having a matched polarization, i.e., parallel to the $\overline{X}_H$ axis.

If the geophone R polarization were orthogonal to the polarization of the source, i.e., parallel to the $\overline{X}_V$ direction as depicted in FIG. 8, it would respond to different projections of both the slower $SH_1$ and faster $SH_2$ shear waves components, according to the projection of their polarizations onto the geophone polarization axis $\overline{X}_V$, i.e., $SH_{1V}$ and $SH_{2V}$, where $SH_{1V} = -SH_1 \sin\theta$, $SH_{2V} = SH_2 \cos\theta$, $SH_1 = SH \cos\theta$, $SH_2 = SH \sin\theta$. That is, the recorded signals will be as follows:

$$R_V(t) = SH_{1V} \cdot \overline{r}_1(t) + SH_{2V} \cdot \overline{r}_2(t) \qquad (6)$$
$$= -SH_1 \cdot \overline{r}_1(t) \sin\theta \cdot SH_2 \cdot \overline{r}_2(t) \cos\theta$$
$$= -SH \cdot \overline{r}_1(t) \sin\theta \cos\theta \cdot + SH \cdot \overline{r}_2(t) \sin\theta \cos\theta$$

or more simply a combination of $R_1(t)$ and $R_2(t)$ previously discussed in Eqs. (3a, b) as:

$$R_V(t) = -R_1(t) \sin\theta + R_2(t) \cos\theta \qquad (7)$$

Figure 9:
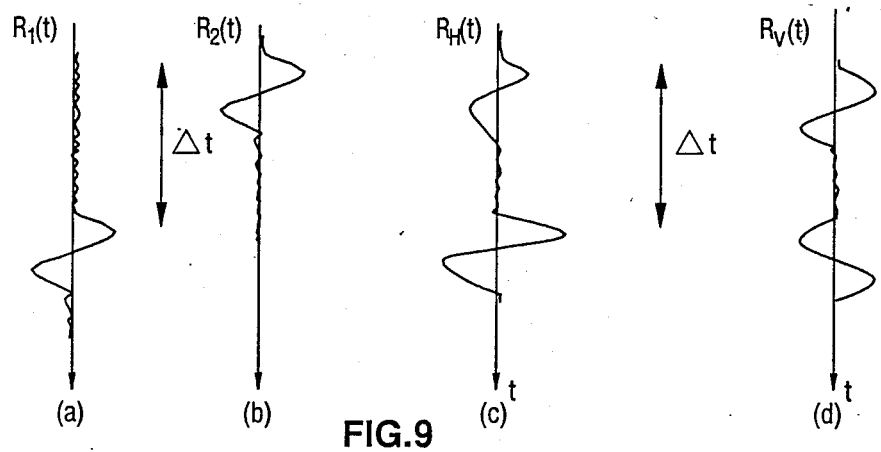
FIGS. 9(a, b, c, d) are representations of signals recorded with the various source/geophone pair polarizations and survey line orientations depicted in FIGS. 5, 6, 7, and 8.

FIGS. 9(a, b, c, d) depict the various signals recorded with the source/geophone pair polarizations and survey line orientations of FIGS. 5, 6, 7, and 8. That is, $R_1(t)$ depicts the recorded signal for the survey line in FIG. 5 parallel to formation axis $\overline{x}_2$ using a source/geophone pair having matched SH polarizations with respect to the survey line. $R_2(t)$ depicts the recorded signal for the survey line in FIG. 6 parallel to the formation axis $\overline{x}_1$ using a source/geophone pair having matched SH polarizations with respect to the survey line. Whereas $R_H(t)$ and $R_V(t)$ depict the signals recorded by geophones having polarizations predominantly along the $\overline{X}_H$ and $\overline{X}_V$ axes, respectively, from SH shear wave energy imparted predominantly along the $\overline{X}_H$ axis, oblique to the $\overline{x}_1$ axis in FIGS. 7 and 8.

At this juncture, it is particularly relevant to note in FIGS. 9(c, d) the multiple arrivals of the reflected shear wave energy in signals, $R_H(t)$ and $R_V(t)$, which are believed to be the predominant source of the confusing and oftentimes uninterpretable shear wave reflection data. Whereas in FIGS. 9(a, b), each signal $R_1(t)$ and $R_2(t)$ depicts only a single shear wavefront arrival, albeit separated in time; either is believed to be representative of those circumstances under which interpretable shear wave seismic data are collected. FIGS. 9(a, b, c, d) show the arrivals from a single reflecting horizon at depth. One skilled in the art can easily generalize this to the case of many reflectors with arbitrary separations in time.

By contrast, the signal $R_H(t)$ is more typical of most field recordings, since the survey line is at an arbitrary angle to the formation axes $\overline{x}_1$, $\overline{x}_2$. In the signal trace $R_H(t)$, the single reflecting horizon is represented by two pulses of energy, thus leading to confusion in interpretation. In the signals $R_H(t)$ and $R_V(t)$, the two arrivals are well separated in time, for clarity of understanding. In fact, the separation $\Delta t$ is often less than the duration of the wavelet, causing confusing interferences between the two arrivals. The time delay $\Delta t$, and the differences in reflection amplitudes evidenced in the recorded signals $R_H(t)$ and $R_V(t)$ in FIG. 9 can provide a measure of formation anisotropy.

Because of the usual oblique angle of the source/geophone polarizations and survey line orientations with respect to the anisotropic formation principal axes, interpretable shear wave reflection seismic data collection has often been unattainable. The method of shear wave seismic exploration disclosed herein ameliorates the effects of shear wave birefringence by resolving multiple arrivals of the shear wave in the recorded seismic signals according to the principal axes of the anisotropic formation. This can be achieved either by orienting the source/geophone polarization and survey line orientations so as to be aligned with one of the anisotropic formation principal axes, or by mathematically inverting the recorded signals, obtained along survey lines at an oblique angle ($\theta$) to the principal axes of the azimuthal formation, to obtain the signals that would have been recorded had the source/geophone pair polarizations and survey line orientations been aligned so as to be parallel to one of the formation principal axes. Alternatively, one can invert the seismic data to obtain prinicpal time series $\overline{r}_1(t)$ and $\overline{r}_2(t)$ which are independent of the source orientation. By simple geometry, one will note that Equations 3–7 reduce to Equation 1 or 2 as the angle $\theta$ approaches 0° or 90°. The inversion process is discussed below.

V. Effect on Recorded Signals: SV Survey

Figure 10:
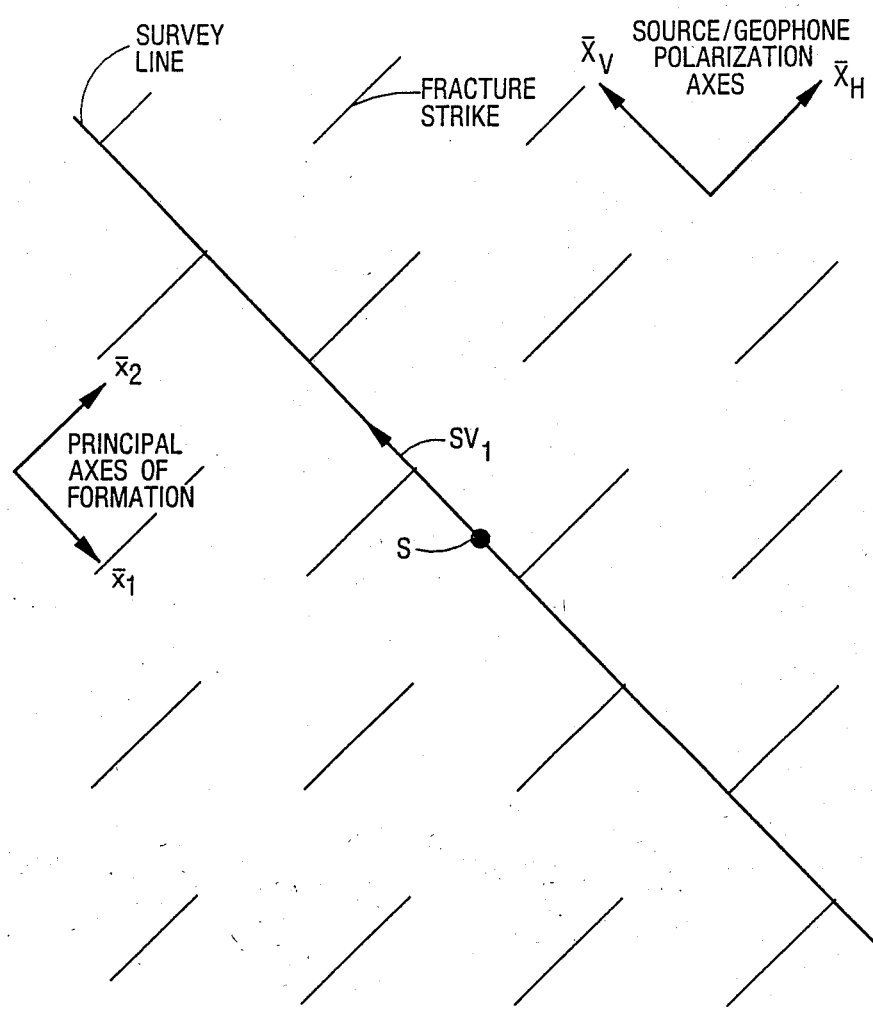
FIGS. 10, 11, 12, and 13 are simplified representations of the azimuthal relationship of source/geophone pair polarizations, survey line orientations and anisotropic formation principal axes.

In FIG. 10, a survey line is parallel to the formation axis $\overline{x}_1$ and a source S, having polarization vector $\overline{SV}_1$ parallel to the $\overline{x}_1$ axis of the formation, is adapted to impart shear wave seismic energy into the earth. A geophone R (not shown) having matched polarization to that of the imparted shear wave, i.e., parallel to $\overline{x}_1$ axis, will record a signal as follows:

$$R_1(t) = -SV_1 \cdot \overline{r}_1(t) \qquad (8)$$

where SV, is the magnitude of the imparted shear wave seismic energy.

If the geophone R were to have a polarization which is orthogonal to the polarization of source S, i.e., parallel to the $\overline{x}_2$ axis of the formation, no signal will be recorded, i.e., $R_2(t) = 0$.

Figure 11:
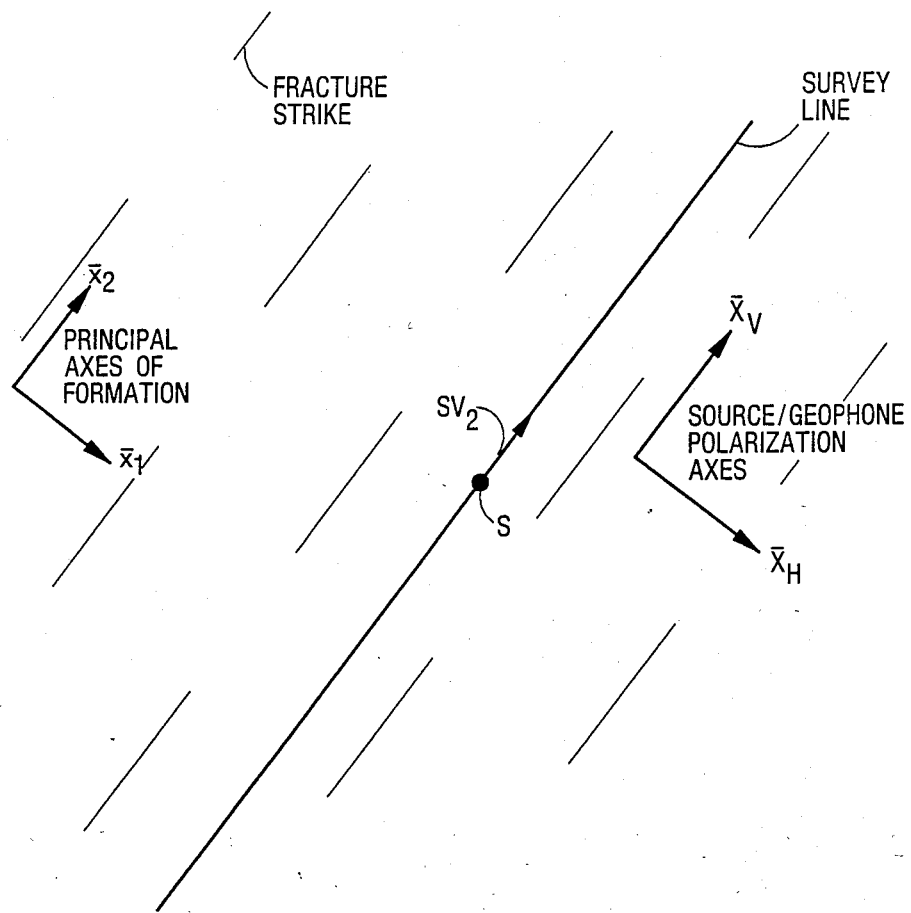

Similarly, in FIG. 11, a survey line is parallel to the formation axis $\overline{x}_2$ and a source S, having polarization vector $\overline{SV}_2$ parallel to the $\overline{x}_2$ axis, is adapted to impart shear wave energy into the earth. A geophone R (not shown) having a polarization matching that of the source S, i.e., parallel to the $\overline{x}_2$ axis, will record the following signal:

$$R_2(t) = SV_2 \cdot \overline{r}_2(t) \qquad (9)$$

where $SV_2$ is the magnitude of the imparted shear wave seismic amplitude.

If the geophone R were to have a polarization which is orthogonal to that of the shear wave source S, i.e., parallel to axis $\overline{x}_1$, no signal will be recorded, i.e., $R_1(t) = 0$.

Figure 12:
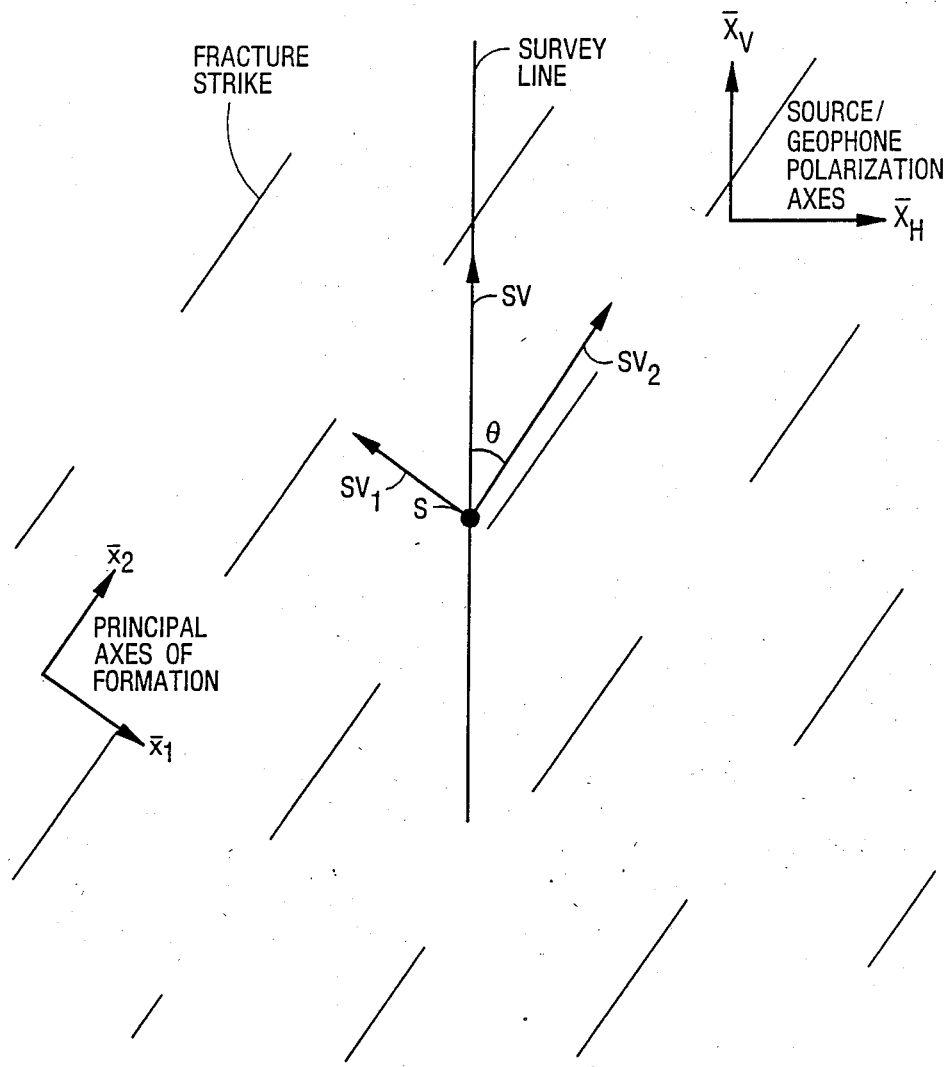

Looking now to FIG. 12, a survey line is at an oblique angle to the fracture strike, or unique axis of an anisotropic formation. If a shear wave source S imparts shear wave energy having a polarization vector $\overline{SV}$ parallel to the $\overline{X}_V$ axis of the source/geophone coordinate system, the imparted shear wave will "split" into two components along the $\overline{x}_1$ and $\overline{x}_2$ directions according to:

$$\vec{SV} = -SV_1\vec{x}_1 + SV_2\vec{x}_2$$

where $SV_1 = SV \sin\theta$, $SV_2 = SV \cos\theta$, where SV is the magnitude of the imparted shear wave seismic amplitude.

A geophone R (not shown) polarized parallel to the $\vec{x}_1$ direction will record only the slower wave component $SV_1$ as follows:

$$R_1(t) = -SV_1 \cdot \vec{r}_1(t) = -SV \sin\theta \cdot \vec{r}_1(t) \tag{10a}$$

If the geophone polarization is aligned parallel to the $\vec{x}_2$ direction, only the faster shear wave component $SV_2$ will be recorded as follows:

$$R_2(t) = SV_2 \cdot \vec{r}_2(t) = SV \cos\theta \cdot \vec{r}_2(t) \tag{10b}$$

Figure 13:
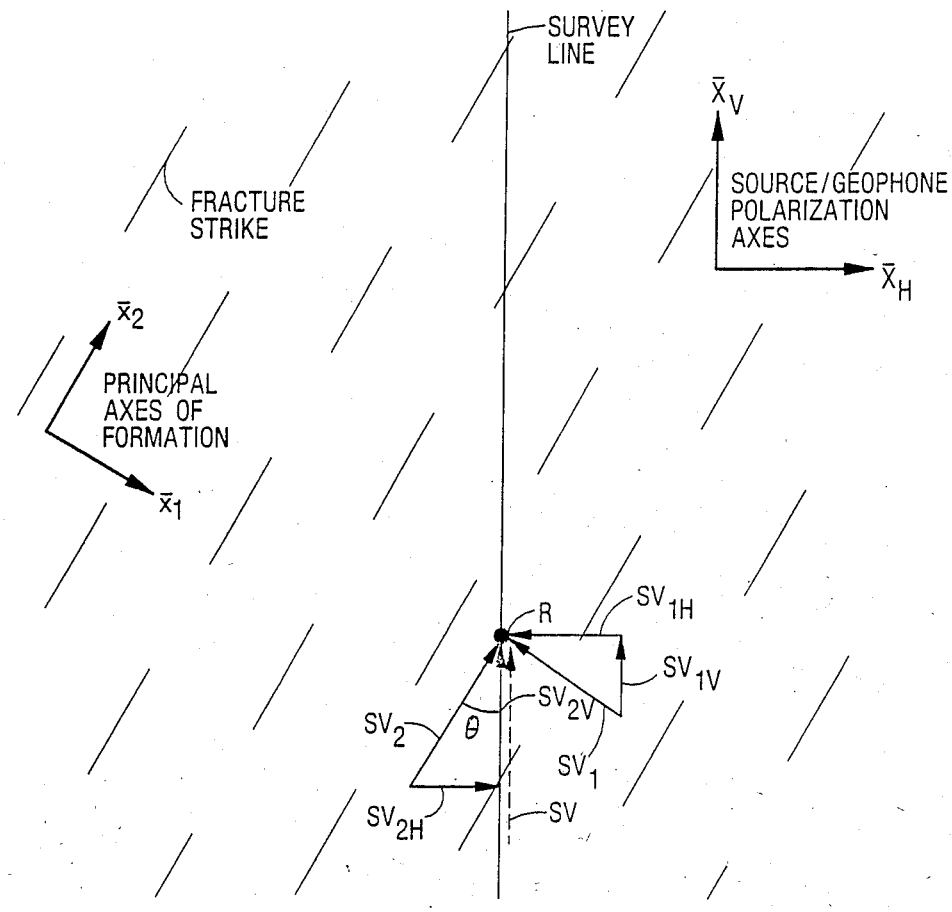

In FIG. 13, the geophone R polarization matches the polarization of the shear wave source, i.e., parallel to the $\vec{X}_V$ axis, as shown by the dashed line SV. The geophone R will respond to components of both the slower $SV_1$ and faster $SV_2$ shear waves according to the projection of each component $SV_{1V}$, $SV_{2V}$ onto the receiver polarization axis, where $SV_{1V} = SV_1 \sin\theta$, $SV_{2V} = SV_2 \cos\theta$, $SV_1 = SV \sin\theta$, $SV_2 = SV \cos\theta$. That is, the recorded signal will be as follows:

$$\begin{aligned}R_V(t) &= SV_{1V} \cdot \vec{r}_1(t) + SV_{2V} \cdot \vec{r}_2(t) \\ &= -SV_1 \cdot \vec{r}_1(t)\sin\theta + SV_2 \cdot \vec{r}_2(t)\cos\theta \\ &= SV \cdot \vec{r}_1(t)\sin^2\theta + SV \cdot \vec{r}_2(t)\cos^2\theta\end{aligned} \tag{11}$$

or more simply a combination the signals $R_1(t)$ and $R_2(t)$ previously discussed in Eqs. (8) and (9) as:

$$R_V(t) = -R_1(t)\sin\theta + R_2(t)\cos\theta \tag{12}$$

Alternatively, if the geophone R polarization is orthogonal to the polarization of the source, i.e., parallel to the $\vec{X}_H$ axis as depicted in FIG. 13, it will respond to components of both the slower $SV_1$ and faster $SV_2$ shear waves according to the projections $SV_{1H}$, $SV_{2H}$, of each component onto the geophone polarization axis $\vec{H}$: where $SV_{1H} = -SV_1 \cos\theta$, $SV_{2H} = SV_2 \sin\theta$, $SV_1 = SV \sin\theta$, $SV_2 = SV \cos\theta$. That is, the recorded signal would be:

$$\begin{aligned}R_H(t) &= SV_{1H} \cdot \vec{r}_1(t) + SV_{2H} \cdot \vec{r}_2(t) \\ &= -SV_1 \cdot \vec{r}_1(t)\cos\theta + SV_2 \cdot \vec{r}_2(t)\sin\theta \\ &= -SV \cdot \vec{r}_1(t)\cos\theta\sin\theta + SV \cdot \vec{r}_2(t)\cos\theta\sin\theta\end{aligned} \tag{13}$$

or more simply a combination the signals $R_1(t)$ and $R_2(t)$ previously discussed in Eqs. (8) and (9) as:

$$R_H(t) = R_1(t)\cos\theta + R_2(t)\sin\theta \tag{14}$$

Figure 14:
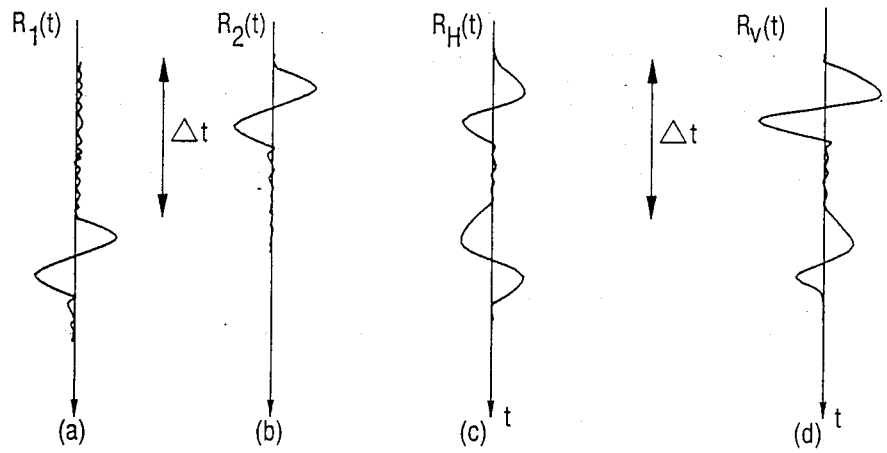
FIGS. 14(a, b, c, d) are representations of signals recorded with the various source/geophone pair polarizations and survey line orientations depicted in FIGS. 10, 11, 12, and 13.

FIGS. 14(a, b, c, d) depict the various signals recorded with the source/geophone pair polarizations and survey line orientations of FIGS. 10, 11, 12, and 13. That is, $R_1(t)$ depicts the recorded signal for the survey line in FIG. 10 parallel to formation axis $\vec{x}_1$ using a source/geophone pair having matched SV polarizations with respect to the survey line. $R_2(t)$ depicts the recorded signal for the survey line in FIG. 11 parallel to the formation axis $\vec{x}_2$ using a source/geophone pair having matched SV polarizations with respect to the survey line. Whereas $R_H(t)$ and $R_V(t)$ depict the signals recorded by geophones having polarizations predominantly along the $\vec{X}_H$ and $\vec{X}_V$ axes, respectively, from SV shear wave energy imparted predominantly along the $\vec{X}_V$ axis in FIGS. 12 and 13.

VI. Field Technique Employing Survey Lines Aligned With One of the Anisotropic Formation Principal Axes for the Detection of Fractured Formations This section relates to a seismic acquisition, processing, and interpretation technique which provides a method for detection of the presence and/or extent of fractured rocks in the subsurface, using surface seismic recordings. Prior to the present invention, the detection of fractured formations by seismic methods was not satisfactorily performed. If fractured formations are identified from the surface using seismic techniques, and if the anisotropic effects in the data are removed, as discussed herein, the viability of searching for hydrocarbon accumulation in or below such fractured formations is greatly enhanced.

The method of this section exploits the predicted azimuthal anisotropy present in the elastic media with oriented fractures. This class of fractures will be referred to as simply azimuthally oriented fractures or fractures. A rock with azimuthally oriented fractures possesses elastic properties of an anisotropic rock, manifested by velocities of propagation which depend upon the direction of propagation and of the particle motion of the elastic wave propagating in such a rock. Again, the present methods apply to any azimuthal anisotropy; the characterization of the anisotropy in terms of fractures is intended only as a visualization aid.

A. Seismic Acquisition

Figure 15:
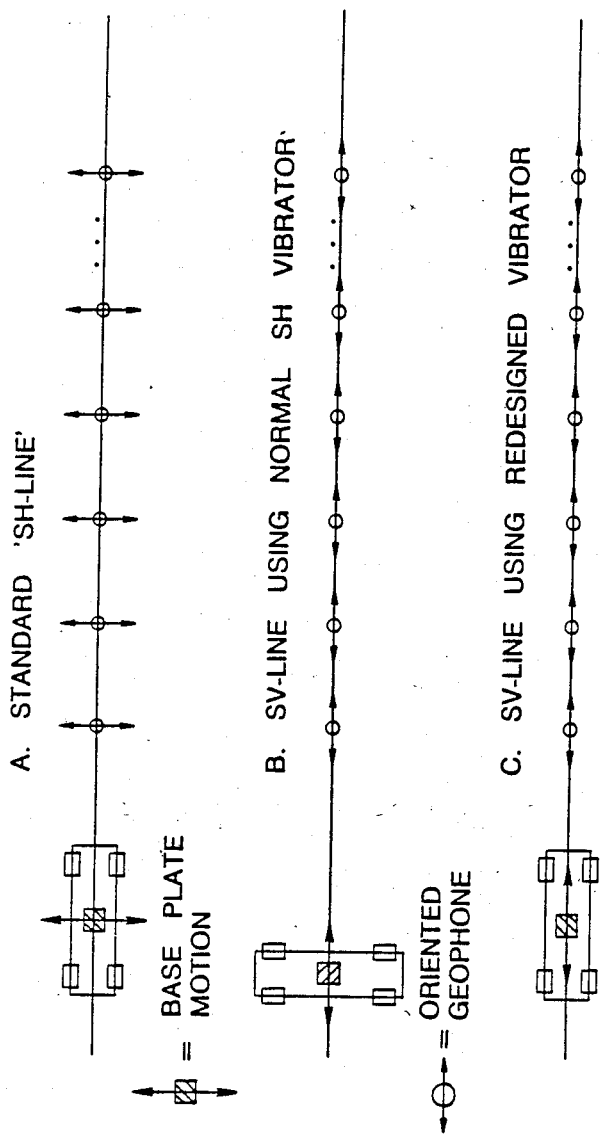
FIG. 15 is a schematic view of a seismic data acquisition technique for use with the present invention.

The source for generating the SH and SV data can be a currently available "shear vibrator," which the horizontal base plate motion for the SH is perpendicular to the direction of the seismic survey line, see FIG. 15. Alternatively, the source can be an impulsive device, having a known line of action or polarization with respect to the line of the survey, which generates shear waves.

This same source, either by turning the vehicle crosswise to the line of action, or by redesigning the device such that the polarization is along the direction of travel of the vehicle, can be used to induce inline (SV) shearing motion along the seismic survey line. It is highly preferable that a seismic source be of the polarized shear type instead of the explosive source type since the polarized shear source generates downwardly propagating waves containing primarily polarized shear motion and polarized shear elastic waves.

In the case where the survey line is parallel to one of the principal axes of an anisotropic formation, the earth's response to the SH source and the SV source can be recorded on matches geophones sensitive to horizontal ground motion oriented to record the same displacements as generated by the shear source. That is, for source vibrations normal to the direction of the survey line (SH, case A of FIG. 15), horizontal geophones will be oriented to detect horizontal motion perpendicular to the survey line as is currently done for the SH case. For the SV source, the geophones will be oriented to detect horizontal motion parallel to the direction of the seismic survey line.

Other than the orientation of the sources and the geophones, data acquisition is carried on in the same manner as usual for conventional CDP data gathering. The results of the described acquisition procedure will form two separate seismic surveys (1) the SH case and/or (2) the SV case. The seismic lines of profile are oriented substantially parallel and perpendicular to the oriented fracture surfaces. For completeness, it is also preferable that a P wave seismic survey line be recorded.

B. Processing

The various sets of data, namely, the P wave line, the SV line, and/or the SH line can be processed using standard CDP techniques of correcting for statics, careful velocity analysis, and correction or normal moveout, sorting into sets of data traces, and then summing that set to create a stacked section for the P wave line, SV line and SH line. The sections resulting from careful processing expose the vertical seismic response (the reflectivity and the travel times) for P waves, and for one or two polarizations of shear wave, namely, SV and/or SH.

C. Interpretation and Deduction

The velocity of propagation in an anisotropic medium varies as a function of the direction of particle motion of the wave, as well as its propagation direction. A vertical direction of propagation has been assumed in the following interpretation such that CDP techniques do produce a good approximation to vertical propagation while reducing the presence of noise and multiple reflections. As such, only those variations due to particle motion are discussed below.

The change in the velocity, resulting from the anisotropy induced by the oriented fractures, manifests itself on the seismic sections as a time difference between arrivals from each reflecting boundary (bounding such anisotropic media) according to the particle motion of the wave traversing the media.

In situations where shear waves encounter oriented fractures, and particle motion is parallel to the dominant fracture orientation, the effective shear modulus is high. In particular, it is higher than the shear modulus for the orthogonal polarization, in which the particle motion is perpendicular to the mean fracture orientation. Thus, the shear wave polarized parallel to the mean fracture orientation has a faster shear velocity of propagation than a shear wave with particle motion perpendicular to mean fracture direction. One is therefore, able to deduce the fracture zone and the orientation by comparing the two shear polarizations obtained from the SV and SH acquisition.

Since the response for the SV and SH polarizations changes as a function of the anisotropy induced by the oriented fractures, this difference can be used with the present invention to deduce whether fracturing is indeed present and to identify the extent of the fracture zone.

VII. Field Techniques Employing Survey Lines Oblique to Anisotropic Formation Principal Axes for Detection of Fractured Formations

A. Seismic Acquisition

The source for generating the SH shear data can be a currently available "shear vibrator," in which the horizontal base plate motion for the (SH) source is perpendicular to the direction of the seismic survey line, see FIG. 15. Alternatively, the source can be an impulsive device having a known line of action or polarization with respect to the line of survey which generates shear waves.

This same source, either by turning the vehicle crosswise to the line, or by redesigning the device such that the polarization is along the direction of travel of the vehicle, can be used as an SV source to induce inline (SV) shearing motion along the seismic survey line. It is highly preferable that the source be of the polarized shear vibrator type instead of the explosive source type since the shear vibrator source generates downwardly propagating waves containing primarily polarized shear motion and polarized shear elastic waves of a known relationship with respect to the survey line.

In the case where the survey line is at an oblique angle ($\theta$) to one of the principal axes of an anistropic formation, the earth's response to the SH source and the SV source can be recorded on matched geophones sensitive to horizontal ground motion oriented to record the same displacements as generated by the shear source. That is, for source vibration normal to the direction of the survey line (SH, Case A of FIG. 15) horizontal geophones will be oriented to detect horizontal motion perpendicular to the survey line as currently done for the conventional SH surveys. For the SV source, the geophones will be oriented to detect horizontal motion parallel to the direction of the seismic survey line. Alternatively, the earth's response to the SH source or the SV source can be recorded by sets of geophones sensitive to horizontal ground motion parallel with and perpendicular to that generated by the shear source.

Other than the orientation of the vibrators, geophones and line of survey, with respect to the anisotropic formation principal axes, seismic acquisition is carried on in the same manner as usual for conventional CDP data gathering. The results of the described acquisition procedure will form two separate seismic surveys. For completeness, it is also preferable that a compressional (P) wave seismic survey line be recorded.

B. Processing

The three sets of data, namely, the P wave line, the SV line, and the SH line can be processed using standard CDP techniques of correcting for statics, careful velocity analysis, and correction or normal moveout, sorting into sets of data traces, and then summing that set to create a stacked section for the P wave line, SV line and SH line. The sections resulting from careful processing expose the vertical seismic response (the reflectivity and the travel times) for P waves, and one or two polarizations of shear wave, namely, SV and/or SH.

C. Interpretation and Deduction

The velocity of propagation in an anisotropic medium varies as a function of the direction of particle motion of the wave, as well as its propagation direction. A vertical direction of propagation has been assumed in the following interpretation such that CDP techniques do produce a good approximation to vertical propagation while reducing the presence of noise and multiple reflections. As such, only those variations due to particle motion are discussed below.

As before, the use of CDP stacked signals as surrogates for normal incidence, multiple-free seismograms is assumed. There are several situations in which the seismic survey line cannot be layed out parallel to either of the principal axis of the anisotropic formation. Consequently, the following two techniques have been devised.

The first case where the recorded signals represent the earth's response to a SH source as recorded by SH oriented geophones can be represented as follows from Eq. (3-5):

$$R_H(t) = R_1(t) \cos\theta + R_2(t) \sin\theta$$

where $R_1(t) = SH_1 \cdot \bar{r}_1(t)$ and $R_2(t) = SH_2 \cdot \bar{r}_2(t)$, and the earth's response to an SV source as recorded by SV oriented geophones can be represented as follows from Eq. (10-12):

$$R_V(T) = -R_1(t) \sin\theta + R_2(t) \cos\theta$$

where $R_1(t) = SV_1 \cdot \bar{r}_1(t)$ and $R_2(t) = SV_2 \cdot \bar{r}_2(t)$.

These signals each represent the result of SH and SV surveys conducted along a seismic line of survey oblique to the unique axis of an anisotropic formation. With a measure of the angle $\theta$ between the line of survey and the unique axis of the anisotropic formation, these equations can be inverted to obtain the seismic signals that would have been recorded along the the principal axes of the anisotropic formation. Specifically, Eqs. (5) and (12) can be inverted for the principal axes signals as follows:

$$R_1(t) = R_H(t) \cos\theta - R_V(t) \sin\theta \tag{15a}$$

$$R_2(t) = R_H(t) \sin\theta + R_V(t) \cos\theta \tag{15b}$$

Equations 15(a,b) show explicitly the processing required to resolve the principal component axes signals $R_1(t)$ and $R_2(t)$ from conventionally recorded SH and SV seismic data.

The signal $R_1(t)$ thus obtained is expected to be a stretched and scaled version of $R_2(t)$. The stretching is due to azimuthal anisotropy; the scaling is due, in part, to the fact that the two modes are unequally excited by the sources, even if the source strengths SH and SV are equal, because of the trigonometric factors in Eqs. (3) and (10). One can obtain signals which are free of these nonessential scaling factors by arranging for the two source strengths to be equal (SH = SV = S), and solving Eqs. (15) for the principal time series:

$$\bar{r}_1(t) = S^{-1}(R_H(t) - R_V(t) \tan\theta) \tag{16a}$$

$$\bar{r}_2(t) = S^{-1}(R_H(t) \tan\theta + R_V(t)) \tag{16b}$$

Equations (16a,b) show explicitly the processing required to resolve the principal time series $\bar{r}_1(t)$ and $\bar{r}_2(t)$ from conventionally recorded SH and SV seismic data. This solution is unstable if $\theta$ is near 90°; this condition will be obvious in the initial data, i.e., $R_H(t)$ will already be a stretched and scaled version of $R_V(t)$.

If $\theta$ is known, then both right sides of Eqs. (16) are known, and the principal axes signals can be calculated as shown. In fact, $\theta$ is frequently known independently, from geologic field work, or tectonic analysis which reveals the predominant orientation of fractures. If $\theta$ is not known independently, it can be estimated by recognizing that (1) $\theta$ can be independent of time, and (2) $r_2(t)$ can be physically related to the reflectivity series $r_1(t)$. In particular, $r_2(t)$ can be a stretched version of $r_1(t)$:

$$r_2(t) = r_1(t(1+\bar{\gamma}))$$

where $\bar{\gamma}(t)$ is the average anisotropy down to time t (a smooth function of t). Hence, one can simply calculate $R_1(t)$ and $R_2(t)$ using Eqs. (15a,b) with different values of $\theta$ (e.g., $\theta = 0, 10, 20, 30, 40, 50, 60, 70, 80, 90$), selecting that result for which $R_2(t)$ appears visually as a stretched and scaled version of $R_1(t)$. The trial value of $\theta$ which produces this result will be close to the actual orientation angle.

More analytically, one can implement this technique if Eq. (16a) is summed over a time window that contains many reflection events:

$$\sum_{i=m}^{n} \bar{r}_1(t_i) = S^{-1}\left[\sum_{i=m}^{n} R_H(t_i) - \tan\theta \sum_{i=m}^{n} R_V(t_i)\right] \tag{17a}$$

and Eq. (16b) is summed over an overlapping window $$\sum_{j=m'}^{n'} \bar{r}_2(t_j) = S^{-1}\left[\tan\theta \sum_{j=m'}^{n'} R_H(t_j) + \sum_{j=m'}^{n'} R_V(t_j)\right] \tag{17b}$$

with different window parameters m' and n', such that $$m' = m(1+\bar{\gamma}),$$

$$n' = n(1+\bar{\gamma}),$$

it should be true that $$\sum_{m}^{n} \bar{r}_1(t) = \sum_{m'}^{n'} \bar{r}_2(t) \tag{18}$$

Hence, subtracting Eqs. (17):

$$0 = \tan\theta \sum_{m'}^{n'} R_H(t) - \sum_{m}^{n} R_H(t) + \sum_{m'}^{n'} R_V(t) + \tan\theta \sum_{m}^{n} R_V(t) \tag{19}$$

Equation (19) can be solved for $\theta$, if $\bar{\gamma}(t)$ is known. In turn, $\bar{\gamma}(t)$ can be found by iteratively testing various $\bar{\gamma}(t)$ until Eq. (19) is satisfied (with resultant $\theta$ time-independent), and Eq. (16) is satisfied also. In summary, Eqs. (16-19) provide a way to recover the pure components $R_1(t)$ and $R_2(t)$, from conventional SH and SV surveys conducted over azimuthally anisotropic formations.

Alternatively, in those situations when the earth's response to the SH or SV source is recorded by sets of geophones sensitive to horizontal ground motion both parallel and perpendicular to the motion generated by the shear wave vibrator, the following signals can be recorded. In a first case, the earth's response to the SH source is recorded by SH and SV oriented geophones. The signals shown in Eqs. (5) and (7), respectively, are recorded. Repeating these:

$$R_H(t) = R_1(t) \cos\theta + R_2(t) \sin\theta \tag{20a}$$

$$R_V(t) = -R_1(t) \sin\theta - R_2(t) \cos\theta \tag{20b}$$

If only the Eqs. (20a,b) are recorded, one can still obtain the seismic trace signals which would have been recorded along the principal axes by the following inversion:

$$R_a(t) = R_H(t) \cos\theta - R_V(t) \sin\theta \tag{21a}$$

$$R_2(t) = R_H(t) \sin\theta + R_V(t) \cos\theta \quad (21b)$$

Further, one can solve Eqs. (21), using Eqs. (3a,b) for the principal time series:

$$\bar{r}_1(t) = 1/SH(R_H(t) - R_V(t) \tan\theta) \quad (22a)$$

$$\bar{r}_2(t) = 1/SH(R_H(t) + R_V(t) \cot\theta) \quad (22b)$$

Equations (22a,b) show explicityly the processing required to resolve the principal time series $\bar{r}_1(t)$ and $\bar{r}_2(t)$ from seismic data generated by an SH source and recorded by SH and SV oriented geophones. This solution is unstable if $\theta$ is near 0° or 90°; however, this condition will be apparent in the initial seismic data, i.e., the signal $R_V(t)$ will be null.

In a second case, the earth's response to an SV source is recorded by SH and SV oriented geophones, the signals shown in Eqs. (14) and (12), respectively, are recorded. Repeating these:

$$R_H(t) = R_1(t) \cos\theta + R_2(t) \sin\theta \quad (23a)$$

$$R_V(t) = -R_1(t) \sin\theta + R_2(t) \cos\theta \quad (23b)$$

If only the Eqs. (23a,b) are recorded, one can still obtain the seismic trace signals which would have been recorded along the principal axes by the following inversion:

$$R_1(t) = R_H(t) \cos\theta - R_V(t) \sin\theta \quad (24a)$$

$$R_2(t) = R_H(t) \sin\theta + R_V(t) \cos\theta \quad (24b)$$

Further, one can solve Eqs. (23), using Eqs. (10a,b) for the principal time series:

$$\bar{r}_1(t) = -1/SV(R_H(t) \cot\theta R_V(t)) \quad (25a)$$

$$\bar{r}_2(t) = 1/SV(R_H(t) \tan\theta + R_V(t)) \quad (25b)$$

Equations (25a,b) show explicitly the processing required to resolve the principal time series $\bar{r}_1(t)$ and $\bar{r}_2(t)$ from seismic data generated by an SV source and recorded by SH and SV oriented geophones. This solution is unstable if $\theta$ is near 0° or 90°; however, this condition will be apparent in the initial seismic data, i.e., the signal $R_H(t)$ will be null.

In the absence of seismic data generated by both SV and SH sources into both SH and SV geophones (due to economic, practical, historical, or other reasons), the solution for $R_1(t)$ and $R_2(t)$ via Eqs. (21) or (24) can still be used, or the solution for $\bar{r}_1(t)$ and $\bar{r}_2(t)$ via Eqs. (22) or (25) can still be used, with $\theta$ found as discussed below. In the first place, $\theta$ is frequently known independently, from geologic field work, or tectonic analysis which reveals the predominant orientation of fractures. In such a case, Eqs. (21) or (24) or (22) or (25) may be resolved directly.

If $\theta$ is not known independently, it may be estimated by recognizing that (1) $\theta$ is independent of time, and (2) that $r_2(t)$ is physically related to $r_1(t)$. In particular, it may be argued on physical grounds that $r_2(t)$ is just a stretched version of $r_1(t)$:

$$r_2(t) = r_1(t(1+\bar{\gamma})) \quad (26)$$

where $\bar{\gamma}(t)$ is the average anisotropy down to time t (a smooth function of t). First, one may simply calculate $R_1(t)$ and $R_2(t)$ by assuming different values of $\theta$ (e.g., $\theta = 0, 10, 20, 30, 40, 50, 60, 70, 80, 90$) and selecting the result for which $R_2(t)$ appears visually as a stretched version of $R_1(t)$. The trial value of $\theta$ which produces this result will be close to the actual orientation angle. More analytically, one can implement this technique using the approximation technique set forth in Eqs. 17-19, above.

Figure 16:
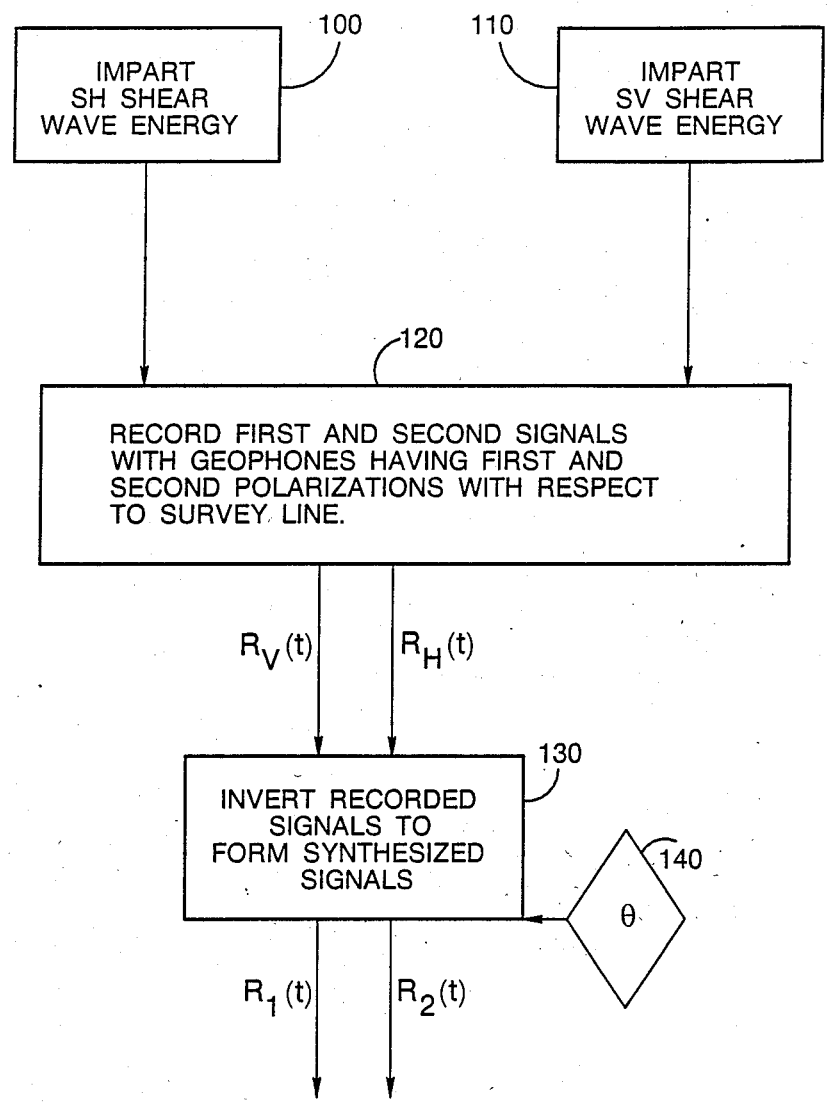
FIG. 16 is a block flow diagram of the present invention.

Looking now to FIG. 16, a block flow diagram of the present invention is set forth. In particular, shear wave seismic energy can be imparted with an SH oriented shear wave vibrator at 100 and/or an SV oriented shear wave vibrator at 110 and the imparted seismic energy is recorded with geophones having first and second polarizations with respect to the survey line at 120. As previously described, the recorded signals $R_V(t)$ and $R_H(t)$ can be the result of any one of the following combinations: (a) an SH source recorded by SH and SV geophones; (b) an an SV source recorded by SH and SV geophones; (c) SH source recorded by SH geophones and SV source recorded by SV geophones; (d) any other combination of two polarizations of geophones (substantially different in orientation) from a single source of known polarity; or (e) any other combination of two polarizations of source (substantially different in orientation) into a single geophone of known polarization. At 130 (with a measure of the angle $\theta$, i.e., the angle between the survey line and the unique axis determined at 140), the recorded signals $R_V(t)$ and $R_H(t)$ are inverted, and the principal component signals $R_1(t)$ and $R_2(t)$ can be obtained as well as the principal time series $\bar{r}_1(t)$ and $\bar{r}_2(t)$, in which the deleterious effects of shear wave birefringence resulting from anisotropic formations can be ameliorated.

The foregoing disclosure and description of the invention are illustrative and explanatory thereof, and various changes in the details of the illustrated technique may be made without departing from the scope of the invention as hereinafter defined by the appended claims.

What is claimed is:

1. A method of seismic exploration along a line of survey, wherein the line of survey is at an oblique angle to the unique axis of a subterranean azimuthally anisotropic formation comprising the steps of:
   a. imparting first shear wave seismic energy into the earth at selected points along the line of survey with a first shear wave source having a first polarization with respect to the line of survey;
   b. recording first signals representative of the earth's response to the first shear wave source at selected points along the line of survey with first geophones having a first polarization with respect to the line of survey;
   c. imparting second shear wave seismic energy into the earth at selected points along the line of survey, with respect to a second shear wave source having a second polarization with the line of survey;
   d. recording second signals representative of the earth's response to the second shear wave source at selected points along the line of survey with second geophones having a second polarization with respect to the line of survey, and
   e. with a measure of the oblique angle between the line of survey and the unique axis of the subterranean azimuthally anisotropic formation to be surveyed, processing the first and second signals to obtain principal component signals representative of the anisotropic formation along first and second axes so as to ameliorate the effects of shear wave birefringence on the first and second signals.

2. The method of claim 1 wherein:
the first recorded signal represents the earth's response to the first shear wave source recorded by the first geophone, wherein both the first shear wave source and the first geophone both have matched polarizations; and
the second recorded signal represents the earth's response to the second shear wave source recorded by the second geophone, wherein both the second shear wave source and the second geophone have matched polarizations.

3. The method of claim 1 wherein:
the first and second recorded signals represent the earth's response to the first and second shear wave sources having matched polarizations and recorded by first and second geophones having mutually orthogonal polarizations.

4. The method of claim 1 wherein:
the first and second recorded signals represent the earth's response to the first and second shear wave sources having mutually orthogonal polarizations and recorded by first and second geophones having matched polarizations.

5. The method of claim 2 wherein the step of processing the first and second recorded signals to obtain principal component signals in which the deleterious effects of shear wave birefringence resulting from anisotropic formations can be ameliorated according to:

$$R_1(t) = [R_H(t) \cos\theta - R_V(t) \sin\theta]$$

and $$R_2(t) = [R_H(t) \sin\theta + R_V(t) \cos\theta]$$

where
$R_H(t)$ is the first recorded signal
$R_V(t)$ is the second recorded signal
$\theta$ = angle between the survey line and one of the principal axes of the azimuthally anisotropic formation;
$R_1(t)$ is a signal representative of the anisotropic formation along a first axis thereof; and
$R_2(t)$ is a signal representative of the anisotropic formation along a second axis thereof.

6. The method of claim 3 wherein the step of processing the first and second recorded signals to obtain principal component signals in which the deleterious effects of shear wave birefringence resulting from anisotropic formations can be ameliorated according to:

$$R_1(t) = R_H(t) \cos\theta - R_V(t) \sin\theta$$

and $$R_2(t) = R_H(t) \sin\theta + R_V(t) \cos\theta$$

where
$R_H(t)$ is the first recorded signal by an SH oriented geophone of shear wave energy imparted by an SH shear wave source;
$R_V(t)$ is the second recorded signal by an SV oriented geophone of shear wave energy imparted by an SH shear wave source;
$\theta$ is the angle between the survey line and one of the principal axes of the azimuthally anisotropic formation;

$R_1(t)$ is a signal representative of the anisotropic formation along a first axis thereof; and
$R_2(t)$ is a signal representative of the anisotropic formation along a second axis thereof.

7. The method of claim 3 wherein the step of processing the first and second recorded signals to obtain principal component signals in which the deleterious effects of shear wave birefringence resulting from anisotropic formations can be ameliorated according to:

$$R_1(t) = R_H(t) \cos\theta - R_V(t) \sin\theta$$

$$R_2(t) = R_H(t) \sin\theta + R_V(t) \cos\theta$$

where
$R_H(t)$ is the first recorded signal by an SH oriented geophone of shear wave energy imparted by an SV shear wave source;
$R_V(t)$ is the second recorded signal by an SV oriented geophone of shear wave energy imparted by an SV shear wave source;
$\theta$ is the angle between the survey line and one of the principal axes of the azimuthally anisotropic formation;
$R_1(t)$ is a signal representative of the anisotropic formation along a first axes thereof; and
$R_2(t)$ is a signal representative of the anisotropic formation along a second axes thereof.

8. A method of seismic exploration along a line of survey comprising the steps of:
a. imparting first shear wave seismic energy into the earth at selected points along the line of survey with a first shear wave source having a first polarization with respect to the line of survey;
b. recording first signals $R_H(t)$ representative of the earth's response to the first shear wave source at selected points along the line of survey with first geophones having a first polarization with respect to the line of survey;
c. imparting second shear wave seismic energy into the earth at selected points along the line of survey, with a second shear wave source having a second polarization with the line of survey;
d. recording second signals $R_V(t)$ representative of the earth's response to the second shear wave source at selected points along the line of survey with second geophones having a second polarization with respect to the line of survey, and
e. obtaining principle component signals $R_1(t)$ and $R_2(t)$ from the first and second signals so as to ameliorate the effects of shear wave birefringence on the first and second signals according to:

$$R_1(t) = [R_H(t) \cos\theta - R_V(t) \sin\theta]$$

and $$R_2(t) = [R_H(t) \sin\theta + R_V(t) \cos\theta]$$

where
$R_H(t)$ is the first recorded signal $R_V(t)$ is the second recorded signal;
$\theta$ = angle between the survey line and one of the principal axes of the azimuthally anisotropic formation;
$R_1(t)$ is a signal representative of the anisotropic formation along a first axis thereof; and
$R_2(t)$ is a signal representative of the anisotropic formation along a second axis thereof.

9. The method of claim 8 further including obtaining measures of principal time series according to:

$$\bar{r}_1(t) = S^{-1}(R_H(t) \tan \theta - R_V(t))$$

and $$\bar{r}_1(t) = S^{-1}(R_H(t) \tan \theta + R_V(t))$$

where $\bar{r}_1(t)$ is a first principal time series; $\bar{r}_2(t)$ is a second principal time series; and S is the amplitude of the imparted shear wave energy.

10. A method of seismic exploration along a line of survey comprising the steps of:
 a. imparting first shear wave seismic energy into the earth at selected points along the line of survey with a first shear wave source having a first polarization with respect to the line of survey;
 b. recording first signals $R_H(t)$ representative of the earth's response to the first shear wave source at selected points along the line of survey with first geophones having a first polarization with respect to the line of survey;
 c. recording second signals $R_V(t)$ representative of the earth's response to the first shear wave source at selected points along the line of survey with second geophones having a second polarization with respect to the line of survey, and
 d. obtaining principle component signals $R_1(t)$ and $R_2(t)$ from the first and second signals so as to ameliorate the effects of shear wave birefringence on the first and second signals according to:

$$R_1(t) = R_H(t) \cos \theta - R_V(t) \sin \theta$$

$$R_2(t) = R_H(t) \sin \theta + R_V(t) \cos \theta$$

where
 $R_H(t)$ is the first recorded signal by an SH geophone of shear wave energy imparted by an SV shear wave source;
 $R_V(t)$ is the second recorded signal by an SV geophone of shear wave energy imparted by an SV shear wave source;
 $\theta$ is the angle between the survey line and one of the principal axes of the azimuthally anisotropic formation;
 $R_1(t)$ is a signal representative of the anisotropic formation along a first axes thereof; and
 $R_2(t)$ is a signal representative of the anisotropic formation along a second axes thereof.

11. The method of claim 12 further including obtaining measures of principal time series according to:

$$\bar{r}_1(t) = 1/SH(R_H(t) - R_V(t) \tan \theta)$$

$$\bar{r}_2(t) = 1/SH(R_H(t) + R_V(t) \cot \theta)$$

where $\bar{r}_1(t)$ is a first principal time series; $\bar{r}_2(t)$ is a second principal time series; and SH is the amplitude of the imparted SH shear wave energy.

12. A method of seismic exploration along a line of survey comprising the steps of:
 a. imparting first shear wave seismic energy into the earth at selected points along the line of survey with a first shear wave source having a first polarization with respect to the line of survey;
 b. recording first signals $R_H(t)$ representative of the earth's response to the first shear wave source at selected points along the line of survey with first geophones having a first polarization with respect to the line of survey;
 c. imparting second shear wave seismic energy into the earth at selected points along the line of survey, with a second shear wave source having a second polarization with the line of survey;
 d. recording second signals $R_V(t)$ representative of the earth's response to the second shear wave source at selected points along the line of survey with the first geophones; and
 e. obtaining principle component signals $R_1(t)$ and $R_2(t)$ from the first and second signals so as to ameliorate the effects of shear wave birefringence on the first and second signals according to:

$$R_1(t) = R_H(t) \cos \theta - R_V(t) \sin \theta$$

and $$R_2(t) = R_H(t) \sin \theta + R_V(t) \cos \theta$$

where
 $R_H(t)$ is the first recorded signal by an SH geophone of shear wave energy imparted by an SH shear wave source;
 $R_V(t)$ is the second recorded signal by an SV geophone of shear wave energy imparted by an SH shear wave source;
 $\theta$ is the angle between the survey line and one of the principal axes of the azimuthally anisotropic formation;
 $R_1(t)$ is a signal representative of the anisotropic formation along a first axis thereof; and
 $R_2(t)$ is a signal representative of the anisotropic formation along a second axis thereof.

13. The method of claim 10 further including obtaining measures of principal time series according to:

$$\bar{r}_1(t) = -1/SV(R_H(t) \cot \theta - R_V(t))$$

$$\bar{r}_2(t) = 1/SV(R_H(t) \tan \theta + R_V(t))$$

where $\bar{r}_1(t)$ is a first principal time series; $\bar{r}_2(t)$ is a second principal time series; and SV is the amplitude of the imparted SV shear wave energy.

14. A method of processing seismic data obtained along a line of survey which is at an oblique angle to the unique axis of a subterranean azimuthally anisotropic formation, wherein shear wave seismic energy is imparted into the earth at selected points along the line of survey with a first shear wave source having a first polarization with respect to the line of survey and first signals representative of the earth's response to the seismic energy imparted by the first shear wave source are recorded at selected points along the line of survey with first geophones having a first polarization with respect to the line of survey and shear wave seismic energy is imparted into the earth at selected points along the line of survey with a second shear wave source having a second polarization with the line of survey and second signals representative of the earth's response to the seismic energy imparted by the second shear wave source are recorded at selected points along the line of survey with second geophones having a second polarization with respect to the line of survey, comprising the steps of:
 processing the first and second signals with a measure of the oblique angle between the line of survey and the unique axis of the subterranean azimuthally anisotropic formation to be surveyed, to obtain principal component signals representative of the anisotropic formation along first and second axes so as to ameliorate the effects of shear wave birefringence on the first and second signals.

15. The method of claim 14 including the step of processing the first and second recorded signals to obtain principal component signals in which the deleterious effects of shear wave birefringence resulting from anisotropic formations can be ameliorated according to:

$$R_1(t) = R_H(t) \cos\theta - R_V(t) \sin\theta$$

and $$R_2(t) = R_H(t) \sin\theta + R_V(t) \cos\theta$$

where
- $R_H(t)$ is the first recorded signal
- $R_V(t)$ is the second recorded signal
- $\theta$ is the angle between the survey line and one of the principal axes of the azimuthally anisotropic formation;
- $R_1(t)$ is a signal representative of the anisotropic formation along a first axis thereof, and
- $R_2(t)$ is a signal representative of the anisotropic formation along a second axis thereof.

16. The method of claim 14 including the step of processing the first and second recorded signals to obtain principal component signals in which the deleterious effects of shear wave birefringence resulting from anisotropic formations can be ameliorated according to:

$$R_1(t) = R_H(t) \cos\theta - R_V(t) \sin\theta$$

and $$R_2(t) = R_H(t) \sin\theta + R_V(t) \cos\theta$$

where
- $R_H(t)$ is the first recorded signal by an SH oriented geophone of shear wave energy imparted by an SH shear wave source;
- $R_V(t)$ is the second recorded signal by an SV oriented geophone of shear wave energy imparted by an SH shear wave source;
- $\theta$ is the angle between the survey line and one of the principal axes of the azimuthally anisotropic formation;
- $R_1(t)$ is a signal representative of the anisotropic formation along a first axis thereof; and
- $R_2(t)$ is a signal representative of the anisotropic formation along a second axis thereof.

17. The method of claim 14 including the step of processing the first and second recorded signals to obtain principal component signals in which the deleterious effects of shear wave birefringence resulting from anisotropic formations can be ameliorated according to:

$$R_1(t) = R_H(t) \cos\theta - R_V(t) \sin\theta$$

$$R_2(t) = R_H(t) \sin\theta + R_V(t) \cos\theta$$

where
- $R_H(t)$ is the first recorded signal by an SH oriented geophone of shear wave energy imparted by an SV shear wave source;
- $R_V(t)$ is the second recorded signal by an SV oriented geophone of shear wave energy imparted by an SV shear wave source;
- $\theta$ is the angle between the survey line and one of the principal axes of the azimuthally anisotropic formation;
- $R_1(t)$ is a signal representative of the anisotropic formation along a first axis thereof; and
- $R_2(t)$ is a signal representative of the anisotropic formation along a second axis thereof.

18. The method of claim 15 further including obtaining measures of principal time series according to:

$$\bar{r}_1(t) = S^{-1}(R_H(t) - R_V(t) \tan\theta)$$

and $$\bar{r}_1(t) = S^{-1}(R_H(t) \tan\theta + R_V(t))$$

where
- $\bar{r}_1(t)$ is a first principal time series;
- $\bar{r}_2(t)$ is a second principal time series; and
- S is the amplitude of the imparted shear wave energy.

19. The method of claim 16 further including obtaining measures of principal time series according to:

$$\bar{r}_1(t) = 1/SH(R_H(t) - R_V(t) \tan\theta)$$

$$\bar{r}_2(t) = 1/SH(R_H(t) + R_V(t) \cot\theta)$$

where
- $\bar{r}_1(t)$ is a first principal time series;
- $\bar{r}_2(t)$ is a second principal time series; and
- SH is the amplitude of the imparted SH shear wave energy.

20. The method fo claim 17 further including obtaining measures of principal time series according to:

$$\bar{r}_1(t) = -1/SV(R_H(t) \cot\theta - R_V(t))$$

$$\bar{r}_2(t) = 1/SV(R_H(t) \tan\theta + R_V(t))$$

where
- $\bar{r}_1(t)$ is a first principal time series;
- $\bar{r}_2(t)$ is a second principal time series; and
- SV is the amplitude of the imparted SV shear wave energy.

* * * * *

UNITED STATES PATENT AND TRADEMARK OFFICE
CERTIFICATE OF CORRECTION

PATENT NO. : 4,888,743

DATED : Dec. 19, 1989

INVENTOR(S) : Leon A. Thomsen

It is certified that error appears in the above--identified patent and that said Letters Patent is hereby corrected as shown below:

TITLE PAGE: Attorney, "Stanely" should read --Stanley--.
Column 1, line 63, "developes" should read --developed--.
Column 6, line 63, "twio" should read --two--.
Column 7, line 21, "vgeophone" should read --geophone--.
Column 8, line 2, "$f_1*W_1(t)*\tilde{r}_1(t)$ as $r_1(t)$" should read
-- $f_1*W_1(t)*r_1(t)$ as $\tilde{r}_1(t)$--.
Column 9, line 19, "·$SH_2$" should read --+$SH_2$--; line 21, "·+SH" should read --+SH--.
Column 10, line 40, "SV," should read --$SV_1$--.
Column 11, line 2 of Equation 11, "-$SV_1$" should read --$SV_1$--; line 43, "$\bar{H}$" should read --$\bar{x}H$--;
Column 12, line 36, before "which" insert --in--.
Column 15, Equation 16a, "$\tilde{r}(t)$" should read --$\tilde{r}_1(t)$--.
Column 16, Equation 20b, "-$R_2(t)$" should read --+$R_2(t)$--; Equation 21a, "$R_a(t)$" should read --$R_1(t)$--.

UNITED STATES PATENT AND TRADEMARK OFFICE
CERTIFICATE OF CORRECTION

PATENT NO. : 4,888,743

DATED : December 19, 1989

INVENTOR(S) : Leon A. Thomsen

It is certified that error appears in the above-identified patent and that said Letters Patent is hereby corrected as shown below:

Col. 21, Claim 9, "$\tilde{r}_1(t) = S^{-1}(R_H(t) \tan \theta - R_v(t)$ and $\tilde{r}_1(t) = S^{-1}(R_H(t) \tan \theta + R_v(t))$"

should read

-- $\tilde{r}_1(t) = S^{-1}(R_H(t) - R_v(t) \tan \theta)$ and $\tilde{r}_2(t) = S^{-1}(R_H(t) \tan \theta - R_v(t))$ --.

Signed and Sealed this

Eleventh Day of February, 1992

Attest:

HARRY F. MANBECK, JR.

*Attesting Officer*    *Commissioner of Patents and Trademarks*